United States Patent
Burwell et al.

(10) Patent No.: US 8,080,269 B2
(45) Date of Patent: *Dec. 20, 2011

(54) ANTIMICROBIAL SOLUTIONS AND PROCESS RELATED THERETO

(75) Inventors: Steve R. Burwell, Atlanta, GA (US); Fredrick Busch, Clementon, NJ (US)

(73) Assignee: Byocoat Enterprises, Inc., San Juan, PR (US)

( * ) Notice: Subject to any disclaimer, the term of this patent is extended or adjusted under 35 U.S.C. 154(b) by 243 days.

This patent is subject to a terminal disclaimer.

(21) Appl. No.: 12/418,230

(22) Filed: Apr. 3, 2009

(65) Prior Publication Data

US 2009/0192165 A1    Jul. 30, 2009

Related U.S. Application Data

(63) Continuation of application No. 11/218,956, filed on Sep. 3, 2005, now abandoned, which is a continuation-in-part of application No. PCT/US2004/006599, filed on Mar. 5, 2004.

(60) Provisional application No. 60/451,678, filed on Mar. 5, 2003, provisional application No. 60/507,949, filed on Oct. 3, 2003.

(51) Int. Cl.
*A23L 3/3454* (2006.01)

(52) U.S. Cl. ........ 426/321; 426/323; 426/506; 426/614; 424/115; 435/41; 435/70

(58) Field of Classification Search .................. 426/321, 426/323, 506, 614; 424/115; 435/41, 70
See application file for complete search history.

(56) References Cited

U.S. PATENT DOCUMENTS

| | | | |
|---|---|---|---|
| 2,531,463 | A | 11/1950 | Pryor et al. |
| 3,493,660 | A | 2/1970 | Gill |
| 3,647,808 | A | 3/1972 | Hofmann et al. |
| 3,717,579 | A | 2/1973 | Hofmann et al. |
| 4,199,564 | A | 4/1980 | Silver et al. |
| 4,320,147 | A | 3/1982 | Schaeufele |
| 4,783,340 | A | 11/1988 | McDonnell et al. |
| 4,997,672 | A | 3/1991 | DeSimone et al. |
| 5,109,019 | A | 4/1992 | Lehmann et al. |
| 5,211,961 | A | 5/1993 | Adkinson |
| 5,346,704 | A | 9/1994 | Lajoie |
| 5,366,983 | A | 11/1994 | Lattin et al. |
| 5,622,658 | A | 4/1997 | Lloyd et al. |

(Continued)

FOREIGN PATENT DOCUMENTS

CN    1647643 A    8/2005

(Continued)

OTHER PUBLICATIONS

International Search Report dated Sep. 23, 2004 and International Preliminary Report on Patentability dated Nov. 20, 2006 for PCT/US2003/038118.

(Continued)

*Primary Examiner* — Helen F Heggestad
(74) *Attorney, Agent, or Firm* — Sutherland Asbill & Brennan LLP

(57) ABSTRACT

Disclosed are antimicrobial compositions for treating poultry and meat to substantially eliminate bacteria and microorganism harmful to human. The compositions include various combinations of an aliphatic heteroaryl salt, an aliphatic benzylalkyl ammonium salt, a dialiphatic dialkyl ammonium salt, a tetraalkyl ammonium salt and/or trichloromelamine.

16 Claims, 9 Drawing Sheets

U.S. PATENT DOCUMENTS

| | | | |
|---|---|---|---|
| 5,855,940 | A | 1/1999 | Compadre et al. |
| 5,906,825 | A | 5/1999 | Seabrook, Jr. et al. |
| 6,039,992 | A | 3/2000 | Compadre et al. |
| 6,149,927 | A | 11/2000 | Ghosh |
| 6,251,836 | B1 * | 6/2001 | Duncum et al. ............ 507/90 |
| 6,395,698 | B1 | 5/2002 | Daun et al. |
| 6,525,071 | B2 | 2/2003 | Dyer |
| 6,749,804 | B2 | 6/2004 | Schneider et al. |
| 7,109,241 | B1 | 9/2006 | Richter et al. |
| 2002/0064585 | A1 | 5/2002 | Christianson et al. |
| 2002/0076348 | A1 | 6/2002 | Schneider et al. |
| 2002/0119207 | A1 | 8/2002 | Baker, Jr. et al. |
| 2002/0165260 | A1 | 11/2002 | Dyer |
| 2003/0021818 | A1 | 1/2003 | Compadre et al. |
| 2003/0055096 | A1 | 3/2003 | Oguri |
| 2003/0113384 | A1 | 6/2003 | Fredell et al. |
| 2004/0091448 | A1 | 5/2004 | Kross |
| 2004/0214753 | A1 | 10/2004 | Britten et al. |
| 2005/0031705 | A1 | 2/2005 | Tyndall et al. |
| 2005/0069623 | A1 | 3/2005 | Schneider et al. |
| 2005/0113012 | A1 | 5/2005 | Compadre et al. |
| 2005/0271781 | A1 | 12/2005 | Burwell et al. |

FOREIGN PATENT DOCUMENTS

| | | |
|---|---|---|
| DE | 2 055 208 | 5/1972 |
| DE | 27 49 528 A1 | 5/1979 |
| DE | 19948186 A1 | 7/2000 |
| EP | 0027623 A1 | 4/1981 |
| EP | 0095377 A1 | 11/1983 |
| EP | 0095884 A1 | 12/1983 |
| EP | 0 736 250 A1 | 10/1996 |
| EP | 0 799570 A1 | 10/1997 |
| ES | 346 940 | 1/1969 |
| FR | 2710919 A1 | 4/1995 |
| GB | 1 256 984 | 2/1970 |
| GB | 1 262 026 | 2/1972 |
| GB | 1 268 576 | 3/1972 |
| GB | 1 317 353 | 5/1973 |
| GB | 2 187 097 A | 9/1987 |
| GB | 2 300 565 A | 11/1996 |
| JP | 07285809 | 10/1995 |
| JP | 2002-005579 | 1/2002 |
| JP | 2002-184604 | 6/2002 |
| JP | 2002-184609 | 6/2002 |
| WO | WO 91/01132 | 2/1991 |
| WO | 9738586 A1 | 10/1997 |
| WO | 9919438 A1 | 4/1999 |
| WO | WO 01/49296 A1 | 7/2001 |
| WO | WO 01/54502 A2 | 8/2001 |
| WO | WO 02/069954 A1 | 9/2002 |
| WO | WO 2004/044068 A1 | 5/2004 |
| WO | WO 2004/049799 A2 | 6/2004 |
| WO | WO 2004/077954 A1 | 9/2004 |
| WO | WO 2004/082719 A1 | 9/2004 |
| WO | WO 2005/016377 A1 | 2/2005 |
| WO | WO 2005/079210 A2 | 9/2005 |
| WO | WO 2007/030104 A1 | 3/2007 |
| WO | WO 2008/008362 A2 | 1/2008 |
| WO | WO 2008/031104 A2 | 3/2008 |
| WO | WO 2009/045456 A1 | 4/2009 |

OTHER PUBLICATIONS

International Preliminary Report on Patentability dated Sep. 9, 2005 and Written Opinion dated Aug. 12, 2004 for PCT/US2004/006599.
International Preliminary Report on Patentability dated Mar. 4, 2008 and Written Opinion dated Feb. 8, 2006 for PCT/US2005/031563.
International Search Report dated Apr. 4, 2006, International Preliminary Report on Patentability dated Jun. 7, 2006 and Written Opinion dated Apr. 4, 2006 for PCT/US2004/040823.
International Preliminary Report on Patentability dated Apr. 7, 2010 and Written Opinion dated Dec. 12, 2008 for PCT/US2008/011393.
Disclosure Under 37 CFR 1.56 dated Sep. 23, 2010 for U.S. Appl. No. 12/418,230.
Supplemental Disclosure Under 37 CFR 1.56 dated Feb. 16, 2011 for U.S. Appl. No. 12/418,230.
Supplementary European Search Report for EP 05808425, dated Dec. 8, 2010, Munich.
Becker, Hank, "Fighting a Fungal Siege on Cacao Farms," Agricultural Research, Nov. 1999, p. 4-8.
Donald K. Sutton, William E. MacHardy and William G. Lord, "Effects of Shredding or Treating Apple Leaf Litter with Urea on Ascospore Dose of *Venturia inaequalis* and Disease Buildup," Plant Disease, 2000, vol. 84, No. 12, Abstract.
Hisashi Sakurai, Shoko Fujita and Hisashi Naito, "Comparison of the Antimicrobial Activity of Various Agricultural Chemicals against Phytopathogenic Bacteria and Fungi Recently isolated from Diseased Plants," Journal of Pesticide Science, 1977, 2(3), 249-255.
Anderson et al., "Efficacies of Three Sanitizers Under Six Conditions of Application to Surfaces of Beef," J. Food Sci., 42(2):326-329, 1977.
Bali, "Efficacy of Sanitizing Treatments of Broilers & Short Loins," A thesis presented to the Graduate School of the University of Missouri, Ch. I & Ch. V, 1970.
Barnes et al., "Effects of two cetylpyridinium chloride-containing mouthwashes on plaque," J. Periodontol, 47:419-422, 1976.
Bernheimer, "Comparative Kinetics of Hemolysis Induced by Bacterial and Other Hemolysins," Journal of General Physiology, 337-353 (Oct. 18, 1946).
Bosilevac et al., "Prevalence of *Escherichia coli* O157 and levels of aerobic bacteria and enterobacteriaceaea are reduced when hides are washed and treated with cetylpyridinium chloride at a commercial beef processing plant," J. Food Prot., 67(4):646-650, (2004b).
Bosilevac et al., "Protocol for evaluating the efficacy of cetylpyridinium chloride as a beef hide intervention," J. Food Prot., 67(2):303-309, 2004.
Breen et al., "Elimination of *Salmonella* Contamination from Poultry Tissues by Cetylpyridinium Chloride Solutions," J. Food Prot., 60(9):1019-1021, 1997.
Breen et al., "Quarternary Ammonium Compounds Inhibit and Reduce the Attachment of Viable *Salmonella typhimurium* to Poultry Tissues," J. Food Sci., 60(6):1191-1196, 1995.
Cox, M., "The inhibition of *Listeria monocytogenes* by electrostatic spray application of a CPC-based solution onto turkey bologna," A thesis presented to the Graduate School of Clemson University, pp. 1-76, May 2006.
Cutter et al., "Antimicrobial activity of cetylpyridinium chloride washes against pathogenic bacteria on beef surfaces," J. Food Prot., 63(5):593-600, 2000.
Dincher et al., Khranitelna Promishlenost, 25(3):17-21, 1976. Translation not available.
Du Moulin et al., "Use of Cetylpyridinium Chloride in the Decontamination of Water for Culture of Mycobacteria," Applied and Environmental Microbiology, 36(5):771-773 (1978).
First International Symposium, Ecology of *Salmonella* in Pork Production, Proceeding Food Safety Consortium, 9-13, 1996.
Geden et al., "Efficacies of Mixtures of Disinfectants and Insecticides," Poultry Sci., 66(4):659-665, 1987.
Herzog et al., "Evaluation of an Electrostatic Spray Application System for Control of Insect Pests in Cotton," J. Econ. Entomol., 6:637-640, 1983.
Hines, R.L., "Electrostatic atomization and spray painting," J. Appl. Physics, 37(7):2730-2736, 1966.
Hsu et al., "Effect of spraying on chemical properties and bacterial efficacy of electrolysed oxidizing water," Int. J. Food Sci. and Tech, 39:157-165, 2004.
Jimenez-Villareal et al., "The impact of single antimicrobial intervention treatment with cetylpyridinium chloride, trisodium phosphate, chlorine dioxide, or lactic acid on ground beef lipid, instrumental color and sensory characteristics," Meat Sci., 65:977-984, 2003.
Kim and Slavik, "Cetylpyridinium Chloride (CPC) Treatment on Poultry Skin to Reduce Attached *Salmonella*," J. Food Prot., 59(3):322-6, 1996.
Kim and Slavik, "Trisodium Phosphate (TSP) Treatment of Beef Surfaces to Reduce *Escherichia Coli* O157:H7 and *Salmonella typhimurium*," J. Food Sci., 59(1):20-22, 1994.

Ladokhin and White, "Protein chemistry at membrane interfaces: non-additivity of electrostatic and Hydrophobic interactions," J. Mol. Biol., 309:543-552.

Lavers, "Packaging v. the Grease Resistance of Some Common Packaging Materials," Canadian Journal of Research, 25(1):75-79, 1947.

Law and Cooper, "Air-assisted electrostatic sprays for postharvest control of fruit and vegetable spoilage microorganisms," IEEE Transactions on Industry Applications, 37(6):1597-1602, 2001.

Law and Lane, "Electrostatic Deposition of Pesticide Spray Onto Foliar Targets of Varying Morphology," Transact of the ASAE, 24:1441-1448, 1981.

Law, "Embedded-Electrode Electrostatic Induction Spray Charging Nozzle: Theoretical & Engineering Design," Transact of the ASAE, 12:1096-1104, 1978.

Li et al., "Pre-Chill Spray of Chicken Carcasses to Reduce *Salmonella typhimurium*," J. Food Sci., 62(3):605-607, 1997.

Li et al., "*Salmonella typhimurium* Attached to Chicken Skin Reduced Using Electrical Stimulation and Inorganic Salts," J. Food Sci., 94(1):23-29, 1994.

Lim and Mustapha, Effects of cetylpyridinium chloride, acidified sodium chlorite, and potassium sorbate on populations of *Escherichia coli* O157:H7, *Listeria monocytogenes*, and *Staphylococcus aureus* on fresh beef, J. Food Prot., 67(2):310-315, 2004.

Maeda et al., Bactericidal action of 4,4'-($\alpha$, $\omega$-polymethylenedithio)bis-(1-alkyl-pyridinium iodides), Biol. Pharm. Bull., 21:1057-1061, 1998.

Mead et al., "Food Related Illness and Death in the United States," Centers for Disease Control & Prevention, Atlanta, GA 2003.

Mosley et al., "Destruction of Food Spoilage, Indicator and Pathogenic Organisms by Various Germicides in Solution and on a Stainless Steel Surface," J. Milk Food Technol., 39(12):830-836, 1976.

Nakagawa et al., "Antimicrobial Characteristic of Insoluble Alkylpyridinium Iodide," Applied and Environmental Microbiology, 43(5):1041-1050, 1982.

Nekhorosheva, "Use of Semiliquid Nutritional Media in the Study of Bactericidal Activity of Cationic Surface-Active Agents," Laborantornoe Delo, 1:37-39, 1975 (Abstract).

Pohlman et al., "Reduction of *E. coli*, *Salmonella typhimurium*, coliforms, aerobic bacteria, and improvement of ground beef color using trisodium phosphate or cetylpyridinium chloride before grinding," Meat Sci., 60:349-356, 2002.

Rodriguez-Morales et al., "Liquid chromatography determination of residue levels on apples treated with cetylpyridinium chloride," J. Chrom. A, 1062:285-289, 2005.

Shep and Sheperd, Primary interactions of three quaternary ammonium compounds with blastospore of *Candida albicans*. Pharm. Res., 12:649-651, 1995.

Slavik et al., "Morphological Changes of *Salmonella typhimurium* Caused by Electrical Stimulation in Various Salt Solutions," J. Food Prot., 58(4):375-380, 1995.

Sofrey and Maxcy, "Tolerance of Bacteria for Quaternary Ammonium Compounds," J. Food Sci., 33:536-540, 1968.

Thomas and McMeekin, "Factors Which Affect Retention of *Salmonella* by Chicken Muscle Fascia," Biofouling, 5:75-87, 1991.

Venkitanarayanan et al., Efficacy of electrolyzed oxidizing water for inactivating *Escherichia coli*, O157:H7, *Salmonella enteritidis*, and *Listeria monocytogenes*. Appl. Env. Microbio., 65(9):4276-4279, 1999a.

Wang et al., "Trisodium Prosphate and Cetylpyridinium Chloride Spraying on Chicken Skin to Reduce Attached *Salmonella typhimurium*," J. Food Prot., 60(8):992-994, 1997.

Weber et al., "Laboratory Procedure for Evaluating Practical Performance of Quaternary Ammonium and Other Germicides Proposed for Sanitizing Food Utensils," Am. J. of Public Health and the Nation's Health, 38:1405-1417, 1948.

Williams and Dillard, "The Effect of External Shell Treatments on *Salmonella* Penetration of Chicken Eggs," Poultry Sci., 52:1084-1089, 1973.

Wilson et al., Susceptibility of biofilms of *Streptococcus sanguis* to chlorhexidine gluconate and cetylpyridinium chloride, Oral Microbiol. Immunol., 11:188-192, 1996.

Xiong et al., Spraying chicken skin with selected chemicals to reduce attached *Salmonella typhimurium*, J. Food Prot., 61(3):272-275, 1998.

Yang and Slavik, "Use of antimicrobial spray applied with an inside-outside birdwasher to reduce bacterial contamination on prechilled chicken carcasses," J. Food Prot., 61(7):829-832, 1998.

* cited by examiner

ANTIMICROBIAL SOLUTIONS AND PROCESS RELATED THERETO

CROSS REFERENCE TO RELATED APPLICATIONS

This application is a continuation of U.S. application Ser. No. 11/218,956, filed Sep. 3, 2005, now abandoned, which is a continuation-in-part of International Application No. PCT/US2004/006599, filed Mar. 5, 2004. Application PCT/US2004/006599 claims benefit of priority to U.S. Provisional Application No. 60/451,678, filed Mar. 5, 2003, and U.S. Provisional Application No. 60/507,949 filed Oct. 3, 2003. U.S. application Ser. No. 11/218,956, International Application No. PCT/US2004/006599 and U.S. Provisional Application Nos. 60/451,678 and 60/507,949 are each incorporated by reference herein in their entireties.

FIELD

The disclosed matter generally relates to compositions and methods for reducing or preventing microorganism growth or survival. More specifically, the disclosed matter relates to compositions and methods for treating meat and poultry to eliminate pathogenic microorganisms.

BACKGROUND

Prevention of food-borne illness has been of paramount concern for the food industry, the public, and the regulatory agencies. The Centers for Disease Control and Prevention (CDC) conducted an evaluation to better quantify the impact of food-borne diseases on health in the U.S. (Mead, et al., Food-Related Illness and Death in the United States, Centers for Disease Control and Prevention, Atlanta, Ga., USA, 2003). The report estimated that food-borne diseases cause approximately 76 million illnesses, 325,000 hospitalizations, and 5,000 deaths in the U.S. each year. Known pathogens account for an estimated 14 million illnesses, 60,000 hospitalizations, and 1,800 deaths. Three pathogens, *Salmonella*, *Listeria*, and *Toxoplasma*, are responsible for 1,500 deaths each year, more than 75% of those deaths caused by known pathogens, while unknown agents account for the remaining 62 million illnesses, 265,000 hospitalizations, and 3,200 deaths. Other food-borne microorganisms that are of public health concern include *Aeromonas hydrophila*, *Arcobacter butzleri*, *Bacillus cereus*, *Campylobacter jejuni*, *Escherichia coli*, and *Staphylococcus aureus*. Fred R. Shank, Director of the Center for Food Safety and Applied Nutrition of the Food and Drug Administration testified before the U.S. Congress that the yearly cost of food-borne illness in the U.S. is between $7.7 and $23 billion.

*Salmonella* is one of the more common intestinal infections with potentially fatal consequences. The CDC reports that every year approximately 40,000 cases of salmonellosis are reported in the U.S. Because many milder cases are not diagnosed or reported, the actual number of infections is likely much higher. Salmonellosis is more common in warmer months than during the winter months. And the most likely to have severe infections are young children, the elderly, and the immuno-compromised. It is estimated that approximately 600 persons die each year with acute salmonellosis.

*Salmonella* and many other microorganisms can adhere to poultry, meat, and other food tissues, making removal of the microorganisms difficult with rinsing alone. Consequently, treatments including irradiation, chemical treatment, and physical processing have been used to address the problem of microorganism contamination of food. For example, trisodium phosphate has been used in poultry processing to eliminate *Salmonella typhimurium*. However, studies have provided conflicting results on efficacy of trisodium phosphate against treating *Salmonella*.

A common problem with many treatments is that they may be effective against one type of microorganism but not others. For example, U.S. Pat. No. 5,366,983 discloses a composition containing an aqueous solution of a quaternary ammonium compound ("QAC"). It has been reported, however, that QAC's including alkyl pyridinium halides (such as cetylpyridinium chloride ("CPC") and cetylpyridinium bromide ("CPB")) were effective in removing *Salmonella* but not other types of microorganisms. It has also been found that treatment with CPC requires contacting the meat or poultry with large quantities of CPC for long periods of time. This requires costly downstream processing steps to remove the CPC. Typically, this is done by recapturing the product as it is sprayed and hauled out, similar to toxic waste.

U.S. Pat. No. 5,855,940 also discloses a composition containing a QAC for inhibiting attachment of and removing pathogenic toxin-producing *Escherichia* contamination. This patent discloses a composition containing QAC selected from the group consisting of alkyl pyridinium, tetraalkylammonium, and alkylalicyclic ammonium salts in an aqueous solution.

Other treatment methods include treatment with a chlorine solution or with a solution of tri-sodium phosphate. Chlorine solutions have been found ineffective in eliminating all of the pathogenic microorganisms. Also, when chlorine is added to a solution or water, the efficacy of the chloride is only as good as the mole concentration of the chloride ion. The concentration of chloride ion can decrease rapidly due to the ion interacting with, for example, nascent oxygen. Tri-sodium phosphate has been used during the reprocessing stage where the inside and outside of the poultry is sanitized. This process, however, requires filtering the reprocessor's water before disposal in order to remove tri-sodium phosphate. Still other common antimicrobial compositions that are used, while effective on some surfaces, can not be used on food surfaces due to their toxicity.

Presently, there are no known effective antimicrobial compositions that are effective against a broad range of microorganisms and can be safely be used on food surfaces. Accordingly, there is a need for antimicrobial compositions and methods for treating contaminated food such as poultry and meat to eliminate a broad range of microorganisms. Further there is also a need for antimicrobial compositions that can be effectively be used on other surfaces, such as floors, coolers, tables, trays, and the like. The antimicrobial compositions and methods disclosed herein meet these and other needs.

SUMMARY

In accordance with the purposes of the disclosed materials, compounds, compositions, and methods, as embodied and broadly described herein, the disclosed matter, in one aspect, relates to compositions and methods for preparing and using such compositions. In another example, disclosed herein are antimicrobial compositions and methods for using such compositions to reduce, prevent, or eliminate a microorganism, such as a food-borne microorganism on poultry and meat.

The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

In the following figures "ST" refers to *Salmonella typhimurium*, "LM" refers to *Listeria monocytogenes*, "SA" refers to *Staphylococcus aureau*, "EC" refers to *Escherichia coli*, "PF" refers to *Pseudomonas fluorscens*, and "SP" refers to *Shewanella putrefaciens*. Also, an antimicrobial composition as disclosed herein is indicated as "Test Solution" and a control solution is indicated as "Controls."

Figure 3:
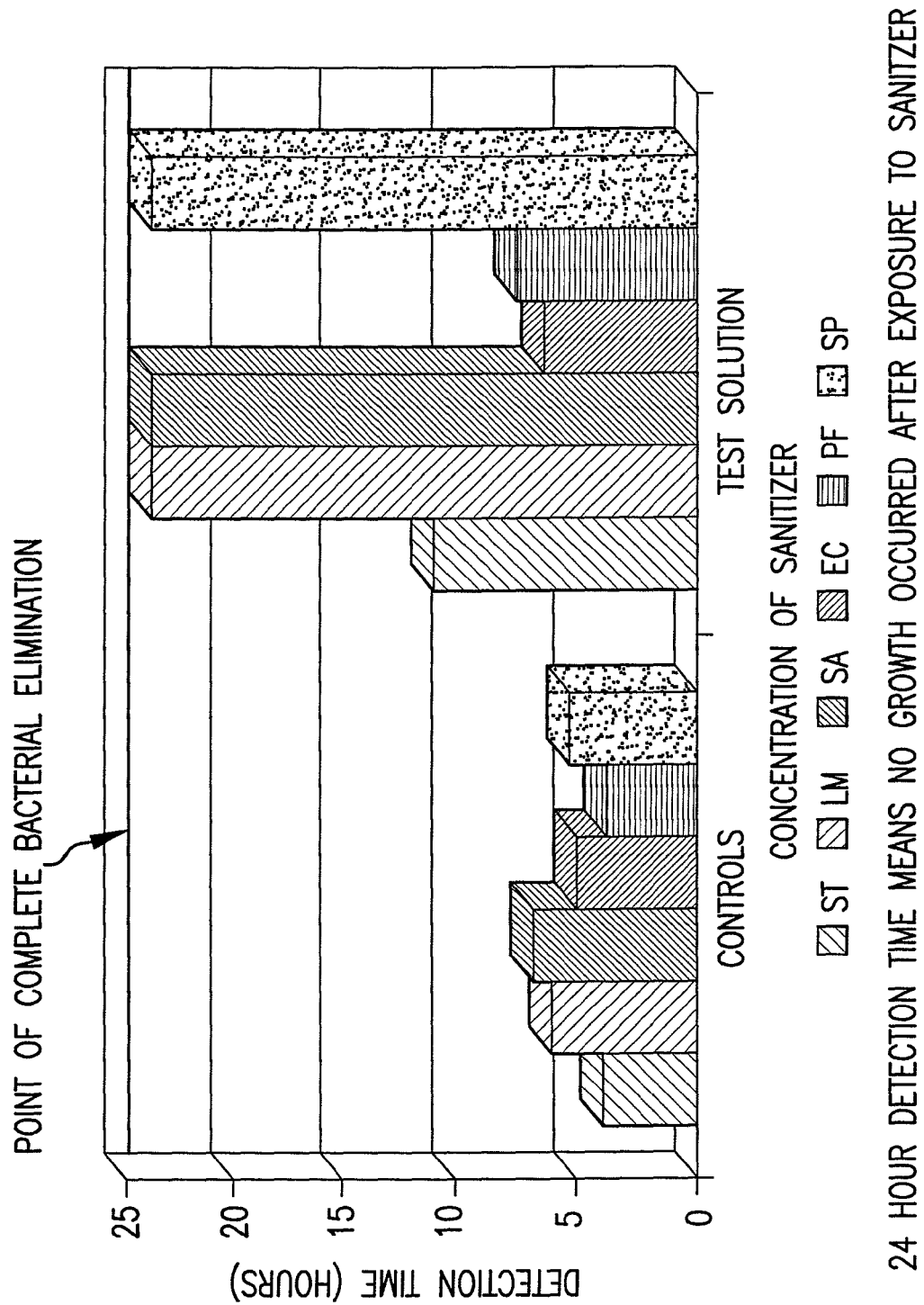

FIG. 3 is a graph showing the effect of an antimicrobial composition as disclosed herein and a control solution on pathogenic and spoilage bacterial isolates. The results are shown in terms of detection times (hours). Detection times of 24 hours mean no growth occurred after exposure to test solution.

Figure 4:
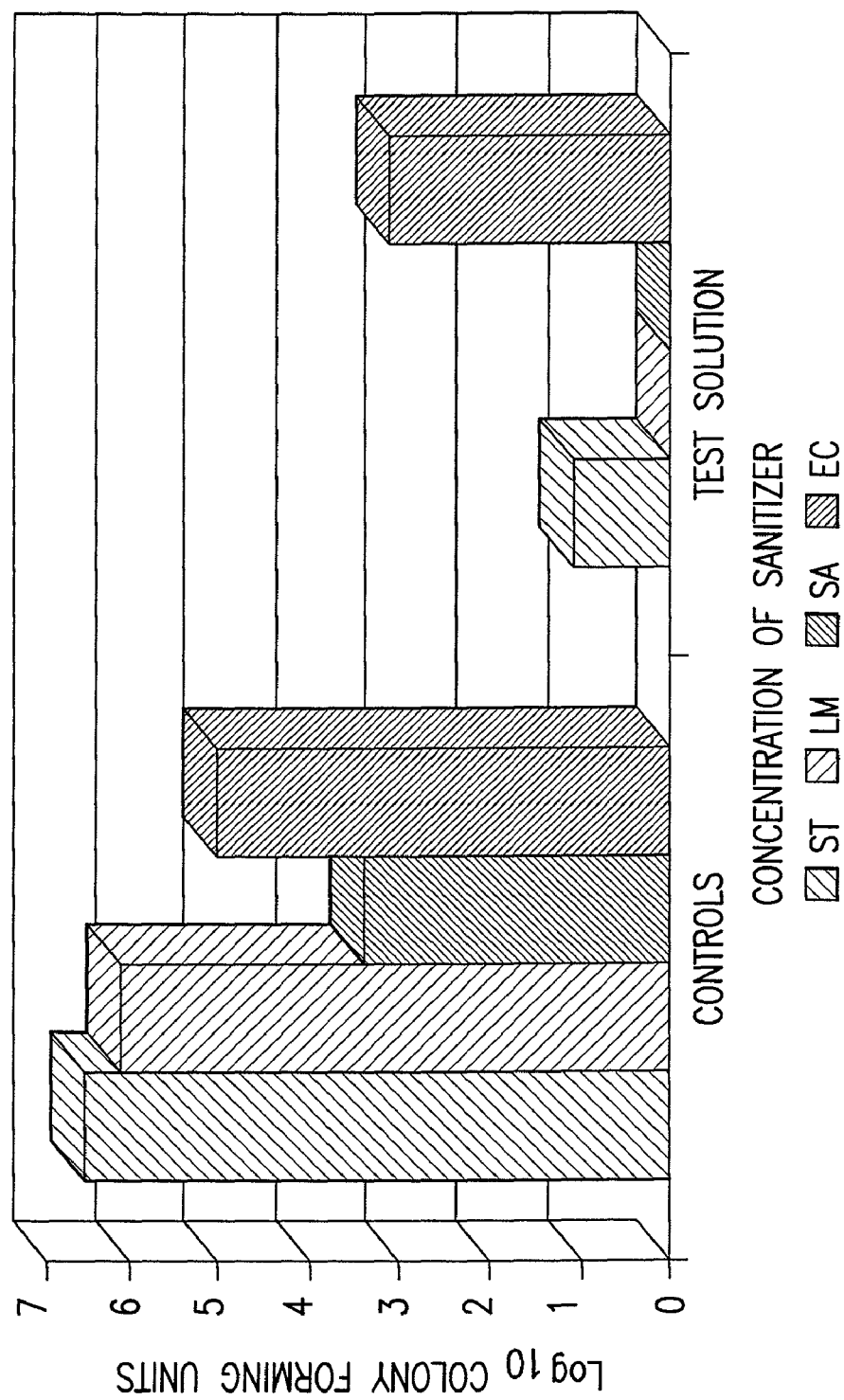

FIG. 4 is a graph showing the reduction of the indicated bacterial colonies (in $\log_{10}$ colony forming units) when exposed to an antimicrobial composition as disclosed herein or a control solution.

Figure 5:
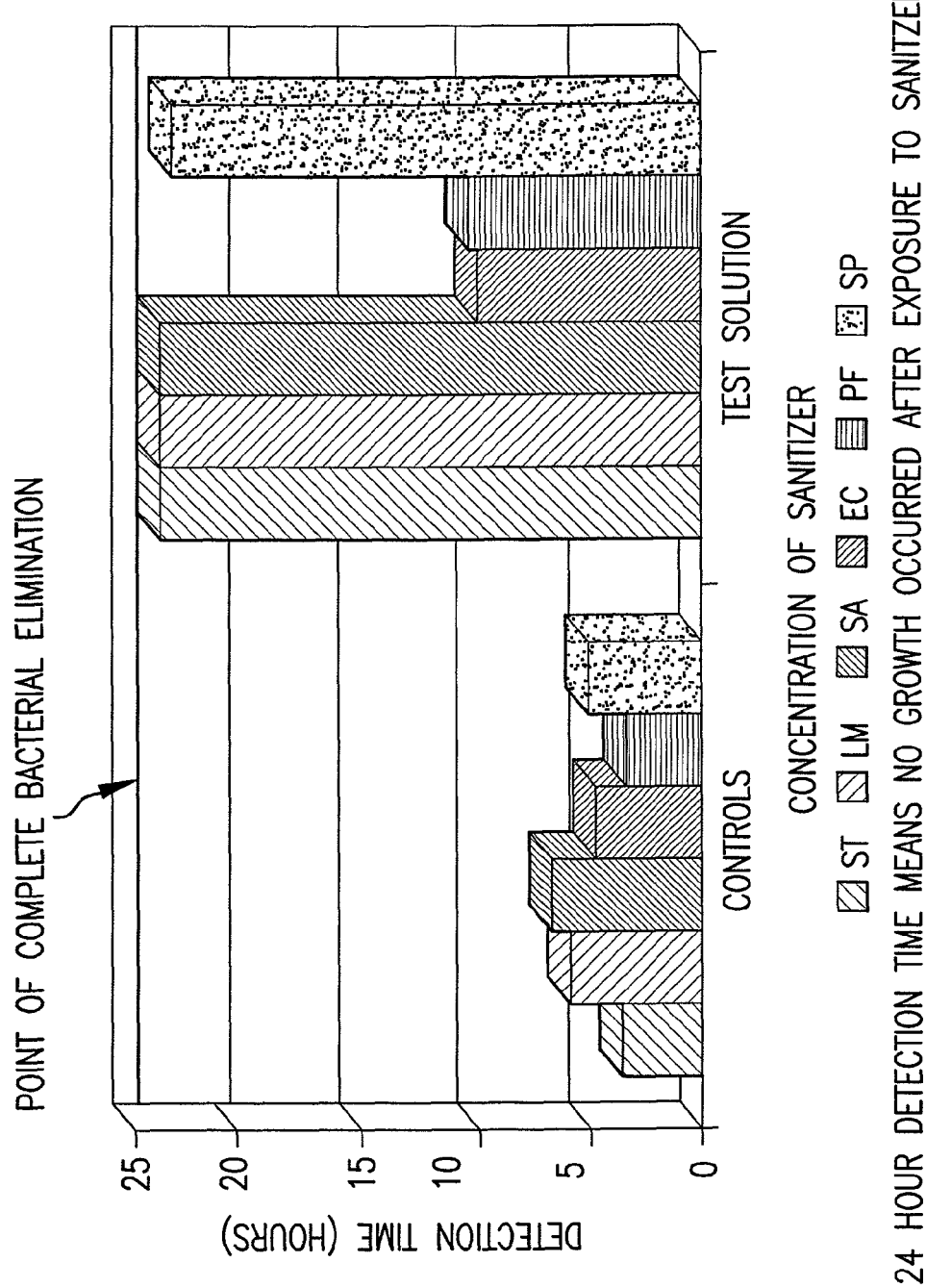

FIG. 5 is a graph showing the effect of an antimicrobial composition as disclosed herein and control solution on the indicated bacterial isolates. The results are shown in terms of detection times (hours). Detection times of 24 hours mean no growth occurred after exposure to test solution.

Figure 6:
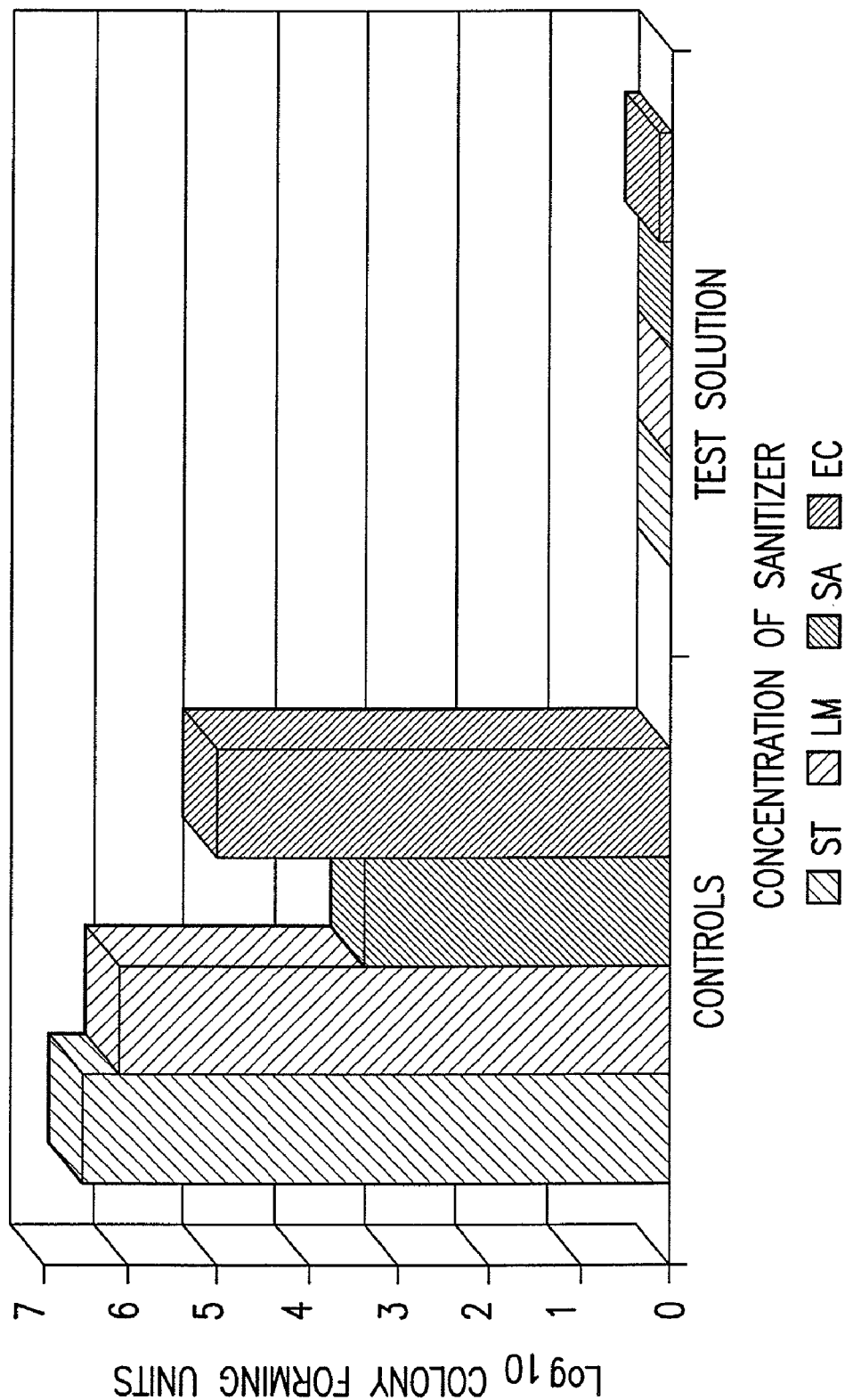

FIG. 6 is a graph showing the reduction of indicated bacterial colonies (in $\log_{10}$ colony forming units) when exposed to an antimicrobial composition as disclosed herein or a control solution.

Figure 7:
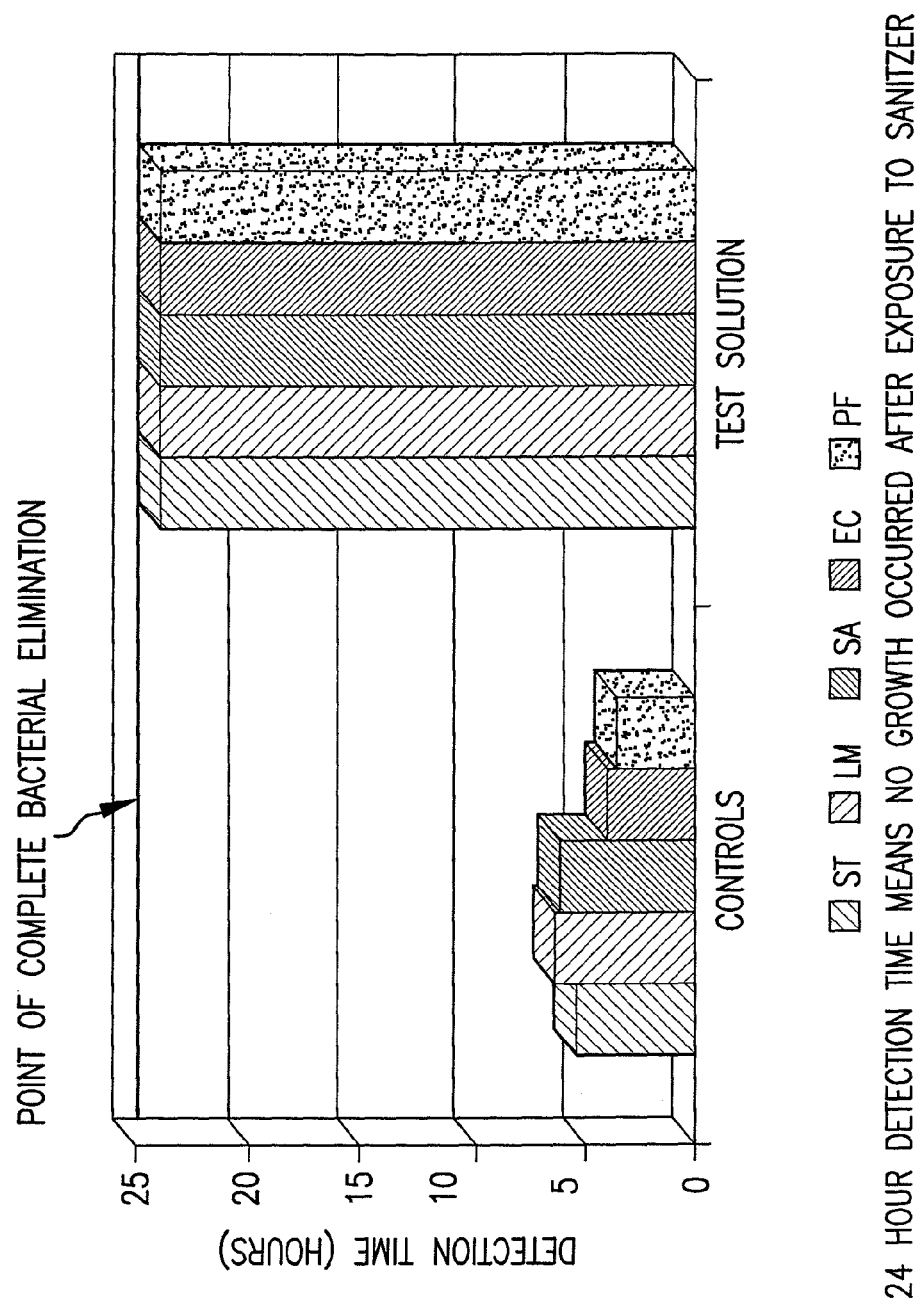

FIG. 7 is a graph showing the effect of an antimicrobial composition as disclosed herein and a control solution when used to treat the indicated microorganisms attached to food contact surfaces. The results are shown in terms of detection times (hours). Detection times of 24 hours mean no growth occurred after exposure to test solution.

Figure 8:
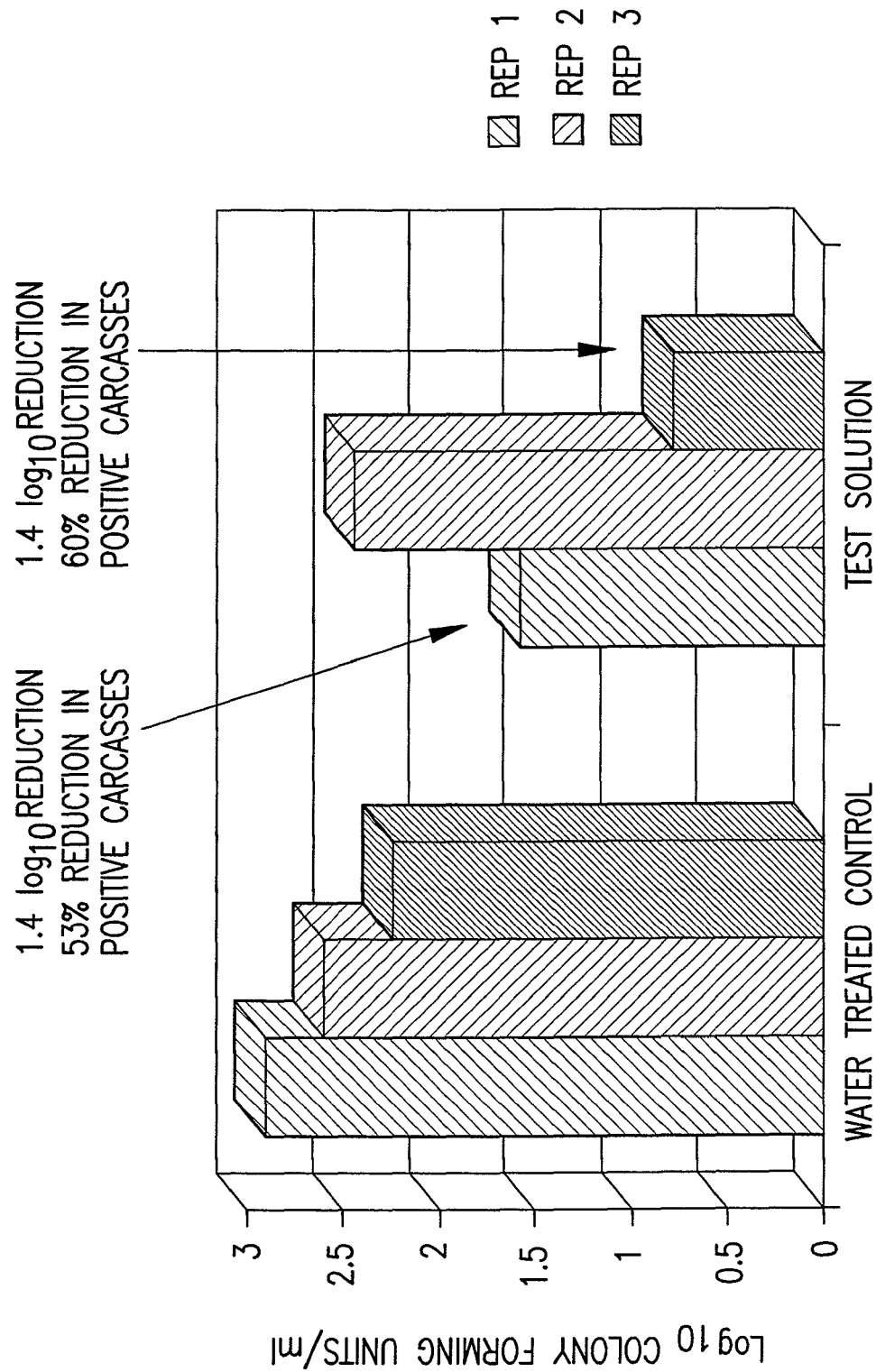

FIG. 8 is a graph comparing *Salmonella* content (in $\log_{10}$ colony forming units) in control samples treated with water and samples treated with a diluted antimicrobial composition as disclosed herein.

Figure 9:
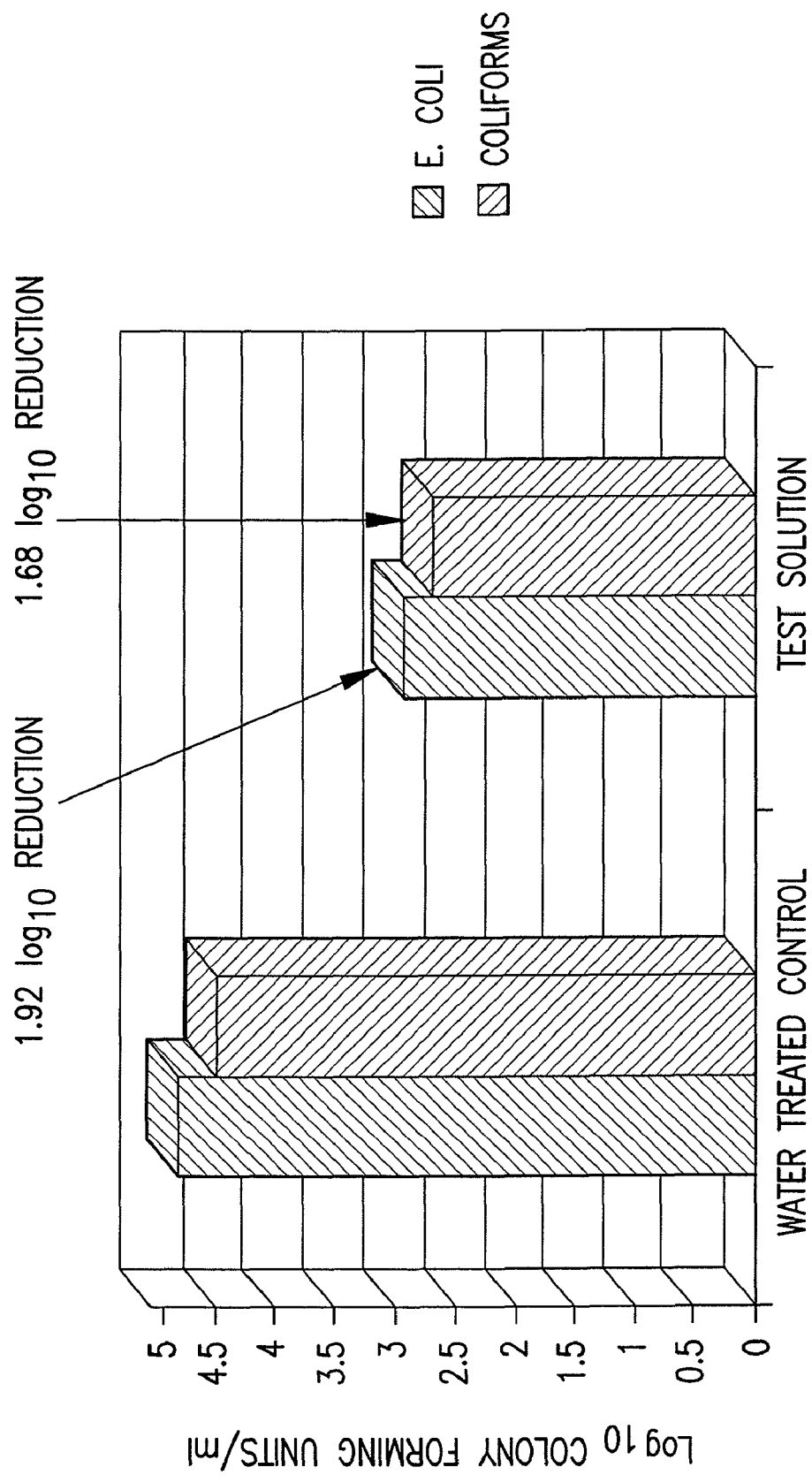

FIG. 9 is a graph comparing *E. coli* or coliforms microbial content (in $\log_{10}$ colony forming units) in control samples treated with water and samples treated with a diluted antimicrobial composition as disclosed herein.

DETAILED DESCRIPTION

The materials, compositions, articles, devices, and methods described herein may be understood more readily by reference to the following detailed description of specific aspects of the disclosed subject matter, and methods and the Examples included therein and to the Figures and their previous and following description.

Before the present materials, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed subject matter pertains. The references disclosed are also individually and specifically incorporated by reference herein for the material contained in them that is discussed in the sentence in which the reference is relied upon.

GENERAL DEFINITIONS

In this specification and in the claims that follow, reference will be made to a number of terms, which shall be defined to have the following meanings:

As used in the specification and the appended claims, the singular forms "a," "an," and "the" include plural referents unless the context clearly dictates otherwise. Thus, for example, reference to "a compound" includes mixtures of two or more such compounds, reference to "an agent" includes mixtures of two or more such agents, reference to "the composition" includes mixtures of two or more such compositions, and the like.

Throughout the specification and claims, the word "comprise" and variations of the word, such as "comprising" and "comprises," means "including but not limited to," and is not intended to exclude, for example, other additives, components, integers, or steps.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed then "less than or equal to 10" as well as "greater than or equal to 10" is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and claims to parts by weight of a particular element or component in a composition or article denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

By "reduce" or other forms of the word, such as "reducing" or "reduction," is meant lowering of an event or characteristic (e.g., microorganism growth or survival). It is understood that this is typically in relation to some standard or expected value, in other words it is relative, but that it is not always necessary for the standard or relative value to be referred to. For example, "reduces the population of bacteria" means lowering the amount of bacteria relative to a standard or a control.

By "prevent" or other forms of the word, such as "preventing" or "prevention," is meant to stop a particular event or characteristic, to stabilize or delay the development or progression of a particular event or characteristic, or to minimize the chances that a particular event or characteristic will occur. Prevent does not require comparison to a control as it is typically more absolute than, for example, reduce. As used herein, something could be reduced but not prevented, but something that is reduced could also be prevented. Likewise, something could be prevented but not reduced, but something that is prevented could also be reduced. It is understood that where reduce or prevent are used, unless specifically indicated otherwise, the use of the other word is also expressly disclosed.

By "treat" or other forms of the word, such as "treated" or "treatment," is meant to administer a composition or to perform a method in order to reduce, prevent, inhibit, break-down, or eliminate a particular characteristic or event (e.g., microorganism growth or survival).

By "antimicrobial" is meant the ability to treat (e.g., reduce, prevent, inhibit, break-down, or eliminate) microorganism growth or survival at any concentration.

CHEMICAL DEFINITIONS

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen and oxygen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. Also, as used herein "substitution" or "substituted with" is meant to encompass configurations where one substituent is fused to another substituent. For example, an alkyl group substituted with an aryl group (or vice versa) can mean that the aryl group is bonded to the alkyl group via a single sigma bond and also that the aryl group and alkyl group are fused, e.g., two carbons of the alkyl group are shared with two carbons of the aryl group.

"$A^1$," "$A^2$," "$A^3$," and "$A^4$" are used herein as generic symbols to represent various specific substituents. These symbols can be any substituent, not limited to those disclosed herein, and when they are defined to be certain substituents in one sentence it does not mean that, in another sentence, they cannot be defined as some other substituents.

The term "alkyl" as used herein is a branched or unbranched saturated hydrocarbon group of 1 to 40 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, octadecyl, eicosyl, tetracosyl, and the like. The alkyl group can also be substituted or unsubstituted. The alkyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, sulfo-oxo, sulfonylamino, nitro, silyl, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "alkyl halide" specifically refers to an alkyl group that is substituted with one or more halides, e.g., fluorine, chlorine, bromine, or iodine. When "alkyl" is used in one sentence and a specific term such as "alkyl halide" is used in another, it is not meant to imply that the term "alkyl" does not also refer to specific terms such as "alkyl halide" and the like.

This practice is also used for other groups described herein. That is, while a term such as "heteroaryl" refers to both unsubstituted and substituted heteroaryl moieties, the substituted moieties can, in addition, be specifically identified herein; for example, a particular substituted heteroaryl can be referred to as, e.g., an "alkyl heteroaryl." Similarly, a substituted alkenyl can be, e.g., an "alkenyl halide," and the like. Again, the practice of using a general term, such as "heteroaryl," and a specific term, such as "alkyl heteroaryl," is not meant to imply that the general term does not also include the specific term.

The term "alkenyl" as used herein is a hydrocarbon group of from 2 to 40 carbon atoms with a structural formula containing at least one carbon-carbon double bond. Asymmetric structures such as $(A^1A^2)C=C(A^3A^4)$ are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, sulfo-oxo, sulfonylamino, nitro, silyl, or thiol.

The term "alkynyl" as used herein is a hydrocarbon group of 2 to 40 carbon atoms with a structural formula containing at least one carbon-carbon triple bond. The alkynyl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, sulfo-oxo, sulfonylamino, nitro, silyl, or thiol.

The term "aliphatic" as used herein refers to a non-aromatic hydrocarbon group and includes branched and unbranched, alkyl, alkenyl, or alkynyl groups.

The term "aryl" as used herein is a group that contains any carbon-based aromatic group including, but not limited to, benzene, benzyl, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, halogenated alkyl, alkoxy, alkenyl, alkynyl, aryl, heteroaryl, aldehyde, amino, carboxylic acid, ester, ether, halide, hydroxy, ketone, sulfo-oxo, sulfonylamino, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, sulfo-oxo, sulfonylamino, nitro, silyl, or thiol.

The term "cycloalkenyl" as used herein is a non-aromatic carbon-based ring composed of at least three carbon atoms and contains at least one double bound, e.g., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, ester, ether, halide, hydroxy, ketone, sulfo-oxo, sulfonylamino, nitro, silyl, or thiol.

The term "cyclic group" is used herein to refer to either aryl groups (e.g., heteraryl, biaryl), non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The terms "amine" or "amino" as used herein are represented by the formula:

where $A^1$, $A^2$, and $A^3$ can each be, independent of one another, hydrogen, an alkyl, halogenated alkyl, alkenyl, alkynyl, aryl, heteroaryl, cycloalkyl, cycloalkenyl, heterocycloalkyl, or heterocycloalkenyl group described above. Also, any of the $A^1$, $A^2$, and $A^3$ substituents can be absent and any of the remaining substituents can be a multivalent group, i.e., form more than one bond with N.

The terms "ammonium" or "quaternary ammonium" are represented by the formula:

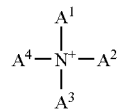

where $A^1$, $A^2$, $A^3$, and $A^4$ can each be, independent of one another, hydrogen, an alkyl, halogenated alkyl, alkenyl, alkynyl, aryl, heteroaryl, cycloalkyl, cycloalkenyl, heterocycloalkyl, or heterocycloalkenyl group described above. Also, any of the $A^1$, $A^2$, $A^3$, and $A^4$ substituents can be absent and any of the remaining substituents can be a multivalent group.

The term "halide" as used herein refers to the halogens fluorine, chlorine, bromine, and iodine.

"X," "$R^1$," "$R^2$," and "$R^n$," where n is some integer, as used herein can, independently, possess two or more of the groups listed above. For example, if R is a straight chain alkyl group, one of the hydrogen atoms of the alkyl group can optionally be substituted with a hydroxyl group (OH), an alkoxy group, halide, etc. Depending upon the groups that are selected, a first group can be incorporated within second group or, alternatively, the first group can be pendant (i.e., attached) or fused to the second group.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixtures.

Reference will now be made in detail to specific aspects of the disclosed materials, compounds, compositions, components, devices, articles, and methods, examples of which are illustrated in the following description and examples, and in the figures and their previous and following description.

Compositions

Disclosed herein, in one aspect, are antimicrobial compositions. The disclosed antimicrobial compositions can be used to treat poultry and meat tissue, as well as other foods, against various microorganisms.

The materials and components that can be used for, can be used in conjunction with, can be used in preparation for, or are products of the disclosed compositions and methods are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a molecule is disclosed and a number of modifications that can be made to a number of substituents are discussed, each and every combination and permutation that are possible are specifically contemplated unless specifically indicated to the contrary. In another example, if a composition is disclosed and a number of modifications that can be made to a number of components in the composition are discussed, each and every combination and permutation that are possible are specifically contemplated unless specifically indicated to the contrary. Thus, if a class of substituents or components A, B, and C are disclosed as well as a class of substituents or components D, E, and F and an example of a combination molecule or combination composition, A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

The disclosed antimicrobial compositions, in some aspects, can comprise any two components selected from the group consisting of an aliphatic heteroaryl salt, trichloromelamine, aliphatic benzylalkyl ammonium salt, dialiphatic dialkyl ammonium salt, and tetraalkyl ammonium salt, wherein when two of the listed components are present, the other listed components are not present. For example, the disclosed antimicrobial compositions can comprise an aliphatic heteroaryl ammonium salt and trichloromelamine, and not the other listed components (i.e., aliphatic benzylalkyl ammonium salt, dialiphatic dialkyl ammonium salt, and tetraalkyl ammonium salt). In another example, the disclosed antimicrobial compositions can comprise trichloromelanine and an aliphatic benzylalkyl ammonium salt, and not the other listed components (i.e., aliphatic heteroaryl salt, dialiphatic dialkyl ammonium salt, and tetraalkyl ammonium salt). In yet another example, the disclosed antimicrobial compositions can comprise an aliphatic benzylalkyl ammonium salt and a tetraalkyl ammonium salt, and not the other listed components (i.e., aliphatic heteroaryl salt, trichloromelamine, aliphatic benzylalkyl ammonium salt, dialiphatic dialkyl ammonium salt, and tetraalkyl ammonium salt).

In a further aspect, disclosed herein are antimicrobial compositions comprising an aliphatic heteroaryl salt, trichloromelamine, and an ammonium salt selected from the group consisting of an aliphatic benzylalkyl ammonium salt, a dialiphatic dialkyl ammonium salt, and a tetraalkyl ammonium salt, wherein when the ammonium salt is the aliphatic benzyl ammonium salt, the composition does not contain the dialiphatic dialkyl ammonium salt or the tetraalkyl ammonium salt, wherein when the ammonium salt is the dialiphatic dialkyl ammonium salt, the composition does not contain the aliphatic benzyl ammonium salt or the tetraalkyl ammonium salt, and wherein when the ammonium salt is the tetraalkyl ammonium salt, the composition does not contain the aliphatic benzyl ammonium salt or the dialiphatic dialkyl ammonium salt. For example, the disclosed antimicrobial compositions can comprise an aliphatic heteroaryl salt, trichloromelamine, and an aliphatic benzylalkyl ammonium salt (e.g., alkyl pyridinium halide, trichloromelamine, and alkyl benzylalkyl ammonium halide). In another example, the disclosed antimicrobial compositions can comprise an aliphatic heteroaryl salt, trichloromelamine, and a dialiphatic dialkyl ammonium salt. In a further example, the disclosed antimicrobial compositions can comprise an aliphatic heteroaryl salt, trichloromelamine, and a tetraalkyl ammonium salt.

In one other example, the disclosed compositions do not contain a cetylpyridinium halide, a benzalkyl ammonium halide, trichloromelamine, and water.

Aliphatic Heteroaryl Salt

The disclosed antimicrobial compositions can comprise an aliphatic heteroaryl salt (e.g., one or more aliphatic heteroaryl salts). An aliphatic heteroaryl salt is a compound that comprises an aliphatic moiety bonded to a heteroaryl moiety, and a counterion, as are defined herein. One or more types of aliphatic heteroaryl salts can be used in the antimicrobial compositions disclosed herein.

Aliphatic Moiety

In the aliphatic heteroaryl salt component of the disclosed antimicrobial compositions, the aliphatic moiety can be any alkyl, alkenyl, alkynyl, cycloalkyl, or cycloalkenyl group, as described herein. Generally, the aliphatic moiety can comprise at least 10, at least 12, at least 14, at least 16, at least 18, or at least 20 carbon atoms. In other examples, the aliphatic moiety can comprise a mixture of aliphatic groups having a range of carbon atoms. For example, the aliphatic moiety can comprise from 10 to 40, from 12 to 38, from 14 to 36, from 16 to 34, from 18 to 32, from 14 to 18, or from 20 to 30 carbon atoms. In some specific examples, the aliphatic moiety can contain 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 carbon atoms, where any of the stated values can form an upper or lower endpoint when appropriate. Examples of specific aliphatic moieties that can be used in the disclosed aliphatic heteroaryl salts include, but are not limited to, decyl, dodecyl (lauryl), tetradecyl (myristyl), hexadecyl (palmityl or cetyl), octadecyl (stearyl), eicosyl (arachidyl), and linolenyl groups, including branched derivatives thereof and any mixtures thereof. In the aliphatic heteroaryl salts, the aliphatic moiety is bonded to a heteroatom in the heteroaryl moiety.

Heteroaryl Moiety

In the aliphatic heteroaryl salt component of the disclosed antimicrobial compositions, the heteroaryl moiety can be any heteroaryl moiety as described herein. For example, the heteroaryl moiety can be an aryl group having one or more heteroatoms. Examples of specific heteroaryl moieties that can be used in the aliphatic heteroaryl salts include, but are not limited to, pyrazole, pyridine, pyrazine, pyrimidine, pryidazine, indolizine, isoindole, indole, indazole, imidazole, oxazole, triazole, thiazole, purine, isoquinoline, quinoline, phthalazine, quinooxaline, phenazine, and the like, including substituted derivatives and mixtures thereof.

In the aliphatic heteroaryl salts, a heteroatom in the heteroaryl moiety is bonded to the aliphatic moiety. When the heteroatom is nitrogen, this forms a quaternary ammonium species.

Counterion

In the disclosed aliphatic heteroaryl salts, the counterion can be any ion that has an opposite charge as the remaining aliphatic heteroaryl portion of the salt. For example, when the heteroatom of heteroaryl moiety is bonded to the aliphatic moiety to form a positively charged quaternary ammonium moiety, the counterion can be a negatively charged moiety. Likewise, if the aliphatic heteroaryl portion is negatively charged, then the counterion can be positively charged. In the disclosed aliphatic heteroaryl salts, one or more different types of counterions can be present.

In some specific examples, the counterion can be a halide, such as a fluoride, chloride, bromide, or iodide. In other examples, suitable counterions for the aliphatic heteroaryl salt can include, but are not limited to, sulfide, sulfates, sulfites, phosphide, phosphates, phosphites, carbonates, bicarbonates, nitrates, nitrites, hypochlorite, chlorite, perchlorate, acetate, formate, hydroxide, and the like, including mixtures thereof.

Specific Examples

In one example, the aliphatic heteroaryl salt can have any of the aliphatic moieties disclosed above combined with any of the heteroaryl moieties disclosed above. In some specific examples, the aliphatic heteroaryl salt can be an alkyl pyridinium salt, an alkyl quinolinium salt, an alkyl imidazolinium salt, or any mixture thereof. In other examples, the aliphatic heteroaryl salt can be an alkenyl pyrazolium salt, an alkenyl pyrazinium salt, an alkenyl quinolinium salt, or any mixture thereof. The counter ions for these specific examples can be halides, nitrates, sulfates, carbonates or any other counterion disclosed herein. In other aspects, a specific example of an alkyl pyridinium salt includes an alkyl pyridinium halide such as, but not limited to, cetylpyridinium halide (e.g., cetylpyridinium chloride, cetylpyridinium bromide, or mixtures thereof), laurylpyridinium halide (e.g., laurylpyridinium chloride, laurylpyridinium bromide, or mixtures thereof), myristylpyridinium halide (e.g., myristylpyridinium chloride, myristylpyridinium bromide, or mixtures thereof), stearylpyridinium halide (e.g., stearylpyridinium chloride, stearylpyridinium bromide, or mixtures thereof), and arachidylpyridinium halide (arachidylpyridinium chloride, arachidylpyridinium bromide, or mixtures thereof). In a specific example, the aliphatic heteroaryl salt can comprise cetylpyridinium chloride, cetylpyridinium bromide, or a mixture thereof.

Amounts

The aliphatic heteroaryl salts disclosed herein can be prepared by methods known in the art or can be obtained from commercial sources. The aliphatic heteroaryl salt can be present in the antimicrobial compositions disclosed herein in an amount of from less than about 20 weight %, less than about 15 weight %, less than about 10 weight %, less than about 8 weight %, less than about 6 weight %, less than about 5 weight %, less than about 4 weight %, less than about 3 weight %, less than about 2 weight %, less than about 1 weight %, or less than about 0.5 weight %, based on the total weight of the antimicrobial composition. In another example, the aliphatic heteroaryl salt can be present in the antimicrobial compositions disclosed herein in an amount of from greater than about 0.5 weight %, greater than about 1 weight %, greater than about 2 weight %, greater than about 3 weight %, greater than about 4 weight %, greater than about 5 weight %, greater than about 6 weight %, greater than about 8 weight %, greater than about 10 weight %, greater than about 15 weight %, or greater than about 20 weight %, based on the total weight of the antimicrobial composition. In still another example, the aliphatic heteroaryl salt can be present in the antimicrobial compositions disclosed herein in an amount of from about 0.5 to about 20 weight %, from about 1 to about 15 weight %, from about 2 to about 10 weight %, from about 3 to about 8 weight %, from about 3.5 to about 8 weight %, from about 4 to about 6 weight %, from about 6 to about 8 weight %, or about 7.5 weight %, based on the total weight of the antimicrobial composition. In yet another example, the aliphatic heteroaryl salt can be present in the antimicrobial compositions disclosed herein in an amount of about 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25. 10.5, 10.75, 11.0, 11.25, 11.5, 11.75, 12.0, 12.25, 12.5, 12.75, 13.0, 13.25, 13.5, 13.75, 14.0, 14.25, 14.5, 14.75, 15.0, 15.25, 15.5, 15.75, 16.0, 16.25, 16.5, 16.75, 17.0, 17.25, 17.5, 17.75, 18.0, 18.25, 18.5, 18.75, 19.0, 19.25, 19.5, 19.75, or 20.0 weight %, based on the total weight of the antimicrobial composition and where any of the stated values can form an upper or lower endpoint when appropriate.

In a further aspect, the antimicrobial compositions disclosed herein can contain less than about 20 parts by weight, less than about 15 parts by weight, less than about 10 parts by weight, less than about 8 parts by weight, less than about 6 parts by weight, less than about 5 parts by weight, less than about 4 parts by weight, less than about 3 parts by weight, less than about 2 parts by weight, less than about 1 part by weight, or less than about 0.5 parts by weight of the aliphatic heteroaryl salt. In another example, the antimicrobial compositions disclosed herein can contain greater than about 0.5 parts by weight, greater than about 1 part by weight, greater than about 2 parts by weight, greater than about 3 parts by weight, greater than about 4 parts by weight, greater than about 5 parts by weight, greater than about 6 parts by weight, greater than about 8 parts by weight, greater than about 10 parts by weight, greater than about 15 parts by weight, or greater than about 20 parts by weight of the aliphatic heteroaryl salt. In still another example, the antimicrobial compositions disclosed herein can contain from about 0.5 to about 20 parts by weight, from about 1 to about 15 parts by weight, from about 2 to about 10 parts by weight, from about 3 to about 8 parts by weight, from about 3.5 to about 8 parts by weight, from about 4 to about 6 parts by weight, from about 6 to about 8 parts by weight, or about 7.5 parts by weight of the aliphatic heteroaryl salt. In yet another example, the antimicrobial compositions disclosed herein can contain about 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, 5.0, 5.25, 5.5, 5.75, 6.0, 6.25, 6.5, 6.75, 7.0, 7.25, 7.5, 7.75, 8.0, 8.25, 8.5, 8.75, 9.0, 9.25, 9.5, 9.75, 10.0, 10.25. 10.5, 10.75, 11.0, 11.25, 11.5, 11.75, 12.0, 12.25, 12.5, 12.75, 13.0, 13.25, 13.5, 13.75, 14.0, 14.25, 14.5, 14.75, 15.0, 15.25, 15.5, 15.75, 16.0, 16.25, 16.5, 16.75, 17.0, 17.25, 17.5, 17.75, 18.0, 18.25, 18.5, 18.75, 19.0, 19.25, 19.5, 19.75, or 20.0 parts by weight of the aliphatic heteroaryl salt, where any of the stated values can form an upper or lower endpoint when appropriate.

Still further, the aliphatic heteroaryl salt can be present in the antimicrobial compositions disclosed herein in any amount disclosed below for trichloromelamine, aliphatic benzylalkyl ammonium salts, dialiphatic dialkyl ammonium salts, or tetraalkyl ammonium salts.

Trichloromelamine

The disclosed antimicrobial compositions can comprise trichloromelamine. Trichloromelamine (i.e., $N^2,N^4,N^6$-Trichloro-2,4,6-triamino-s-triazine) can be prepared by methods known in the art or can be obtained from commercial sources. Trichloromelamine can be present in the antimicrobial compositions disclosed herein in any amount as is described above for the aliphatic benzylalkyl ammonium salt. For example, trichloromelamine can be present in an amount of from in an amount of from less than about 1.0 weight %, less than about 0.75 weight %, less than about 0.5 weight %, less than about 0.25 weight %, less than about 0.10 weight %, less than about 0.075 weight %, less than about 0.05 weight %, less than about 0.025 weight %, less than about 0.01 weight %, less than about 0.0075 weight %, less than about 0.005 weight %, less than about 0.0025 weight %, or less than about 0.001 weight %, based on the total weight of the antimicrobial composition. In another example, trichloromelamine can be present in the antimicrobial compositions disclosed herein in an amount of from greater than about 0.001 weight %, greater than about 0.0025 weight %, greater than about 0.005 weight %, greater than about 0.0075 weight %, greater than about 0.01 weight %, greater than about 0.025 weight %, greater than about 0.05 weight %, greater than about 0.075 weight %, greater than about 0.1 weight %, greater than about 0.25 weight %, greater than about 0.5 weight %, greater than about 0.75 weight %, or greater than about 1.0 weight %, based on the total weight of the antimicrobial composition. In still another example, trichloromelamine can be present in the antimicrobial compositions disclosed herein in an amount of from about 0.001 to about 1.0 weight %, from about 0.0025 to about 0.75 weight %, from about 0.005 to about 0.5 weight %, 0.005 to about 0.1 weight %, from about 0.0075 to about 0.25 weight %, from about 0.01 to about 0.1 weight %, from about 0.025 to about 0.075 weight %, about 0.005 to about 0.1 weight %, about 0.005 to about 0.02 weight %, about 0.005 to about 0.01 weight %, or about 0.01 weight %, based on the total weight of the antimicrobial composition. Still further, trichloromelamine can be present in an amount of from about 0.001 to about 0.1 weight %, from about 0.005 to about 0.075 weight %, from about 0.0075 about 0.05 weight %, or from about 0.01 to about 0.02 weight %, based on the total weight of the antimicrobial composition. In yet another example, trichloromelamine can be present in the antimicrobial compositions disclosed herein in an amount of about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 weight %, based on the total weight of the antimicrobial composition and where any of the stated values can form an upper or lower endpoint when appropriate.

In another example, the disclosed antimicrobial compositions can contain less than about 1.0 parts by weight, less than about 0.75 parts by weight, less than about 0.5 parts by weight, less than about 0.25 parts by weight, less than about 0.10 parts by weight, less than about 0.075 parts by weight, less than about 0.05 parts by weight, less than about 0.025 parts by weight, less than about 0.01 parts by weight, less than about 0.0075 parts by weight, less than about 0.005 parts by weight, less than about 0.0025 parts by weight, or less than about 0.001 parts by weight of trichloromelamine. In still another example, the antimicrobial compositions disclosed herein can contain greater than about 0.001 parts by weight, greater than about 0.0025 parts by weight, greater than about 0.005 parts by weight, greater than about 0.0075 parts by weight, greater than about 0.01 parts by weight, greater than about 0.025 parts by weight, greater than about 0.05 parts by weight, greater than about 0.075 parts by weight, greater than about 0.1 parts by weight, greater than about 0.25 parts by weight, greater than about 0.5 parts by weight, greater than about 0.75 parts by weight, or greater than about 1.0 parts by weight of trichloromelamine. In yet another example, the antimicrobial compositions disclosed herein can contain from about 0.001 to about 1.0 parts by weight, from about 0.0025 to about 0.75 parts by weight, from about 0.005 to about 0.5 parts by weight, 0.005 to about 0.1 parts by weight, from about 0.0075 to about 0.25 parts by weight, from about 0.01 to about 0.1 parts by weight, from about 0.025 to about 0.075 parts by weight, about 0.005 to about 0.1 parts by weight, about 0.005 to about 0.02 parts by weight, about 0.005 to about 0.01 parts by weight, or about 0.01 parts by weight of trichloromelamine. Still further, trichloromelamine can be present in an amount of from about 0.001 to about 0.1 parts by weight, from about 0.005 to about 0.075 parts by weight, from about 0.0075 about 0.05 parts by weight, or from about 0.01 to about 0.02 parts by weight trichloromelamine. In yet another example, the antimicrobial compositions disclosed herein can contain about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 parts by weight of trichloromelamine, where any of the stated values can form an upper or lower endpoint when appropriate.

Still further, the trichloromelamine can be present in the antimicrobial compositions disclosed herein in any amount disclosed above for aliphatic heteroaryl salts or any amount disclosed below for aliphatic benzylalkyl ammonium salts, dialiphatic dialkyl ammonium salts, or tetraalkyl ammonium salts.

Aliphatic Benzylalkyl Ammonium Salt

The disclosed antimicrobial compositions can comprise an aliphatic benzylalkyl ammonium salt. An aliphatic benzylalkyl ammonium salt is a compound that comprises an aliphatic moiety bonded to the nitrogen atom of a benzylalkyl amine moiety, and a counterion, as are defined herein. The aliphatic moiety and counterion can be as described above. The benzylalkyl amine moiety can be a benzyl amine where the amine is bonded to an alkyl or cyclic alkyl group, as described above. One or more types of aliphatic benzylalkyl ammonium salts can be used in the antimicrobial compositions disclosed herein. The aliphatic benzylalkyl ammonium salts suitable for use herein can be prepared by methods known in the art or can be obtained from commercial sources.

In one example, the aliphatic benzylalkyl ammonium salt can be represented by the following formula:

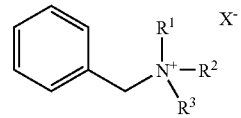

wherein $R^1$ is an aliphatic group, as described above, $R^2$ and $R^3$ are, independent of one another, alkyl groups or cyclic alkyl groups as described herein, and X is a counterion as described herein. In some examples, one or more of the "R" substituents can be a long chain alkyl group (e.g., the number of carbon atoms is greater than 6). In other examples, one or more of the "R" substituents can be a short chain alkyl group (e.g., the number of carbon atoms is 6 or less). In still other examples, one of the "R" substituents is a long chain alkyl group and the other two "R" substituents are short chain alkyl groups.

Specific Examples

In one example, the aliphatic benzylalkyl ammonium salt can have any of the aliphatic moieties disclosed above bonded to any benzylalkyl amine moieties disclosed above. In some specific examples, $R^1$ in the formula of aliphatic benzylalkyl ammonium salts can be an aliphatic group of from 10 to 40 carbon atoms, e.g., a decyl, dodecyl (lauryl), tetradecyl (myristyl), hexadecyl (palmityl or cetyl), octadecyl (stearyl), or eicosyl (arachidyl) group, and $R^2$ and $R^3$ can each be, independent of one another, a methyl, ethyl, propyl, butyl, pentyl, or hexyl group.

In another example, the aliphatic benzylalkyl ammonium salts can include, but are not limited to, alkyl dimethyl benzyl ammonium halides (e.g., alkyl dimethyl benzyl ammonium chloride, alkyl dimethyl benzyl ammonium bromide, or mixtures thereof). Specific examples of alkyl dimethyl benzyl ammonium halides include, but are not limited to, cetyl dimethyl benzyl ammonium halide (e.g., cetyl dimethyl benzyl ammonium chloride, cetyl dimethyl benzyl ammonium chloride bromide, or mixtures thereof), lauryl dimethyl benzyl ammonium halide (e.g., lauryl dimethyl benzyl ammonium chloride, lauryl dimethyl benzyl ammonium bromide, or mixtures thereof), myristyl dimethyl benzyl ammonium halide (e.g., myristyl dimethyl benzyl ammonium chloride, myristyl dimethyl benzyl ammonium bromide, or mixtures thereof), stearyl dimethyl benzyl ammonium halide (e.g., stearyl dimethyl benzyl ammonium chloride, stearyl dimethyl benzyl ammonium bromide, or mixtures thereof), and arachidyl dimethyl benzyl ammonium halide (e.g., arachidyl dimethyl benzyl ammonium chloride, arachidyl dimethyl benzyl ammonium bromide, or mixtures thereof).

In yet another example, the aliphatic benzylalkyl ammonium salts can include, but are not limited to, alkyl methylethyl benzyl ammonium halides. Specific examples of alkyl methylethyl benzyl ammonium halides include, but are not limited to, cetyl methylethyl benzyl ammonium halide (e.g., cetyl methylethyl benzyl ammonium chloride, cetyl methylethyl benzyl ammonium chloride bromide, or mixtures thereof), lauryl methylethyl benzyl ammonium halide (e.g., lauryl methylethyl benzyl ammonium chloride, lauryl methylethyl benzyl ammonium bromide, or mixtures thereof), myristyl methylethyl benzyl ammonium halide (e.g., myristyl methylethyl benzyl ammonium chloride, myristyl methylethyl benzyl ammonium bromide, or mixtures thereof), stearyl methylethyl benzyl ammonium halide (e.g., stearyl methylethyl benzyl ammonium chloride, stearyl methylethyl benzyl ammonium bromide, or mixtures thereof), and arachidyl methylethyl benzyl ammonium halide (e.g., arachidyl methylethyl benzyl ammonium chloride, arachidyl methylethyl benzyl ammonium bromide, or mixtures thereof).

Amounts

The aliphatic benzylalkyl ammonium salts disclosed herein can be prepared by methods known in the art or can be obtained from commercial sources. The aliphatic benzylalkyl ammonium salt can be present in the disclosed antimicrobial compositions in an amount of from less than about 1.0 weight %, less than about 0.75 weight %, less than about 0.5 weight %, less than about 0.25 weight %, less than about 0.10 weight %, less than about 0.075 weight %, less than about 0.05 weight %, less than about 0.025 weight %, less than about 0.01 weight %, less than about 0.0075 weight %, less than about 0.005 weight %, less than about 0.0025 weight %, or less than about 0.001 weight %, based on the total weight of the antimicrobial composition. In another example, the aliphatic benzylalkyl ammonium salt can be present in the antimicrobial compositions disclosed herein in an amount of from greater than about 0.001 weight %, greater than about 0.0025 weight %, greater than about 0.005 weight %, greater than about 0.0075 weight %, greater than about 0.01 weight %, greater than about 0.025 weight %, greater than about 0.05 weight %, greater than about 0.075 weight %, greater than about 0.1 weight %, greater than about 0.25 weight %, greater than about 0.5 weight %, greater than about 0.75 weight %, or greater than about 1.0 weight %, based on the total weight of the antimicrobial composition. In still another example, the aliphatic benzylalkyl ammonium salt can be present in the antimicrobial compositions disclosed herein in an amount of from about 0.001 to about 1.0 weight %, from about 0.0025 to about 0.75 weight %, from about 0.005 to about 0.5 weight %, 0.005 to about 0.1 weight %, from about 0.0075 to about 0.25 weight %, from about 0.01 to about 0.1 weight %, from about 0.025 to about 0.075 weight %, about 0.005 to about 0.1 weight %, about 0.005 to about 0.02 weight %, about 0.005 to about 0.01 weight %, or about 0.01 weight %, based on the total weight of the antimicrobial composition. Still further, the aliphatic benzylalkyl ammonium salt can be present in an amount of from about 0.001 to about 0.1 weight %, from about 0.005 to about 0.075 weight %, from about 0.0075 about 0.05 weight %, or from about 0.01 to about 0.02 weight %, based on the total weight of the antimicrobial composition. In yet another example, the aliphatic benzylalkyl ammonium salt can be present in the antimicrobial compositions disclosed herein in an amount of about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 weight %, based on the total weight of the antimicrobial composition and where any of the stated values can form an upper or lower endpoint when appropriate.

In another example, the disclosed antimicrobial compositions can contain less than about 1.0 parts by weight, less than about 0.75 parts by weight, less than about 0.5 parts by weight, less than about 0.25 parts by weight, less than about 0.10 parts by weight, less than about 0.075 parts by weight, less than about 0.05 parts by weight, less than about 0.025 parts by weight, less than about 0.01 parts by weight, less than about 0.0075 parts by weight, less than about 0.005 parts by weight, less than about 0.0025 parts by weight, or less than about 0.001 parts by weight of the aliphatic benzylalkyl ammonium salt. In another example, the antimicrobial compositions disclosed herein can contain greater than about 0.001 parts by weight, greater than about 0.0025 parts by weight, greater than about 0.005 parts by weight, greater than about 0.0075 parts by weight, greater than about 0.01 parts by weight, greater than about 0.025 parts by weight, greater than about 0.05 parts by weight, greater than about 0.075 parts by weight, greater than about 0.1 parts by weight, greater than about 0.25 parts by weight, greater than about 0.5 parts by weight, greater than about 0.75 parts by weight, or greater than about 1.0 parts by weight of the aliphatic benzylalkyl ammonium salt. In still another example, the antimicrobial compositions disclosed herein can contain from about 0.001 to about 1.0 parts by weight, from about 0.0025 to about 0.75 parts by weight, from about 0.005 to about 0.5 parts by weight, 0.005 to about 0.1 parts by weight, from about 0.0075 to about 0.25 parts by weight, from about 0.01 to about 0.1 parts by weight, from about 0.025 to about 0.075 parts by weight, about 0.005 to about 0.1 parts by weight, about 0.005 to about 0.02 parts by weight, about 0.005 to about 0.01 parts by weight, or about 0.01 parts by weight of the aliphatic benzylalkyl ammonium salt. Still further, the aliphatic benzylalkyl ammonium salt can be present in an amount of from about 0.001 to about 0.1 parts by weight, from about 0.005 to about 0.075 parts by weight, from about 0.0075 about 0.05 parts by weight, or from about 0.01 to about 0.02 parts by weight. In yet another aspect, the antimicrobial compositions disclosed herein can contain about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 parts by weight of the aliphatic benzylalkyl ammonium salt, where any of the stated values can form an upper or lower endpoint when appropriate.

Still further, the aliphatic benzylalkyl ammonium salts can be present in the antimicrobial compositions disclosed herein in any amount disclosed above for aliphatic heteroaryl salts or trichloromelamine or any amount disclosed below for dialiphatic dialkyl ammonium salts or tetraalkyl ammonium salts.

Dialiphatic Dialkyl Ammonium Salts

The disclosed antimicrobial compositions can comprise a dialiphatic dialkyl ammonium salt. A dialiphatic dialkyl ammonium salt is a compound that comprises two aliphatic moieties and two alkyl moieties bonded to a nitrogen atom, and a counterion, as are defined herein. The aliphatic moieties can be the same or different and can be any aliphatic group as described above. The alkyl moieties can be the same or different can be any alkyl group as described above. The counterion can also be as described above. In the disclosed dialiphatic dialkyl ammoniums salts, the two aliphatic moieties can have more than 10 carbon atoms and the two alkyl moieties can have less than 10 carbon atoms. In another alternative, the two aliphatic moieties can have less than 10 carbon atoms and the two alkyl moieties can have more than 10 carbon atoms. One or more types of dialiphatic dialkyl ammonium salts can be used in the antimicrobial compositions disclosed herein.

In some particular examples, the dialiphatic dialkyl ammonium salt can be di-dodecyl dimethyl ammonium chloride or bromide, di-tetradecyl dimethyl ammonium chloride or bromide, dihexadecyl dimethyl ammonium chloride or bromide, and the like, including combinations thereof.

Amounts

The dialiphatic dialkyl ammonium salts disclosed herein can be prepared by methods known in the art or can be obtained from commercial sources. The dialiphatic dialkyl ammonium salt can be present in the disclosed antimicrobial compositions in an amount of from less than about 1.0 weight %, less than about 0.75 weight %, less than about 0.5 weight %, less than about 0.25 weight %, less than about 0.10 weight %, less than about 0.075 weight %, less than about 0.05 weight %, less than about 0.025 weight %, less than about 0.01 weight %, less than about 0.0075 weight %, less than about 0.005 weight %, less than about 0.0025 weight %, or less than about 0.001 weight %, based on the total weight of the antimicrobial composition. In another example, the dialiphatic dialkyl ammonium salt can be present in the antimicrobial compositions disclosed herein in an amount of from greater than about 0.001 weight %, greater than about 0.0025 weight %, greater than about 0.005 weight %, greater than about 0.0075 weight %, greater than about 0.01 weight %, greater than about 0.025 weight %, greater than about 0.05 weight %, greater than about 0.075 weight %, greater than about 0.1 weight %, greater than about 0.25 weight %, greater than about 0.5 weight %, greater than about 0.75 weight %, or greater than about 1.0 weight %, based on the total weight of the antimicrobial composition. In still another example, the dialiphatic dialkyl ammonium salt can be present in the antimicrobial compositions disclosed herein in an amount of from about 0.001 to about 1.0 weight %, from about 0.0025 to about 0.75 weight %, from about 0.005 to about 0.5 weight %, 0.005 to about 0.1 weight %, from about 0.0075 to about 0.25 weight %, from about 0.01 to about 0.1 weight %, from about 0.025 to about 0.075 weight %, about 0.005 to about 0.1 weight %, about 0.005 to about 0.02 weight %, about 0.005 to about 0.01 weight %, or about 0.01 weight %, based on the total weight of the antimicrobial composition. Still further, the dialiphatic dialkyl ammonium salt can be present in an amount of from about 0.001 to about 0.1 weight %, from about 0.005 to about 0.075 weight %, from about 0.0075 about 0.05 weight %, or from about 0.01 to about 0.02 weight %, based on the total weight of the antimicrobial composition. In yet another example, the dialiphatic dialkyl ammonium salt can be present in the antimicrobial compositions disclosed herein in an amount of about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 weight %, based on the total weight of the antimicrobial composition and where any of the stated values can form an upper or lower endpoint when appropriate.

In another example, the disclosed antimicrobial compositions can contain less than about 1.0 parts by weight, less than about 0.75 parts by weight, less than about 0.5 parts by weight, less than about 0.25 parts by weight, less than about 0.10 parts by weight, less than about 0.075 parts by weight, less than about 0.05 parts by weight, less than about 0.025 parts by weight, less than about 0.01 parts by weight, less than about 0.0075 parts by weight, less than about 0.005 parts by weight, less than about 0.0025 parts by weight, or less than about 0.001 parts by weight of the dialiphatic dialkyl ammonium salt. In another example, the antimicrobial compositions disclosed herein can contain greater than about 0.001 parts by weight, greater than about 0.0025 parts by weight, greater than about 0.005 parts by weight, greater than about 0.0075 parts by weight, greater than about 0.01 parts by weight, greater than about 0.025 parts by weight, greater than about 0.05 parts by weight, greater than about 0.075 parts by weight, greater than about 0.1 parts by weight, greater than about 0.25 parts by weight, greater than about 0.5 parts by weight, greater than about 0.75 parts by weight, or greater than about 1.0 parts by weight of the dialiphatic dialkyl ammonium salt. In still another example, the antimicrobial compositions disclosed herein can contain from about 0.001 to about 1.0 parts by weight, from about 0.0025 to about 0.75 parts by weight, from about 0.005 to about 0.5 parts by weight, 0.005 to about 0.1 parts by weight, from about 0.0075 to about 0.25 parts by weight, from about 0.01 to about 0.1 parts by weight, from about 0.025 to about 0.075 parts by weight, about 0.005 to about 0.1 parts by weight, about 0.005 to about 0.02 parts by weight, about 0.005 to about 0.01 parts by weight, or about 0.01 parts by weight of the dialiphatic dialkyl ammonium salt. Still further, the dialiphatic dialkyl ammonium salt can be present in an amount of from about 0.001 to about 0.1 parts by weight, from about 0.005 to about 0.075 parts by weight, from about 0.0075 about 0.05 parts by weight, or from about 0.01 to about 0.02 parts by weight. In yet another example, the antimicrobial compositions disclosed herein can contain about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 parts by weight of the dialiphatic dialkyl ammonium salt, where any of the stated values can form an upper or lower endpoint when appropriate.

Still further, the dialiphatic dialkyl ammonium salts can be present in the antimicrobial compositions disclosed herein in any amount disclosed above for aliphatic heteroaryl salts, trichloromelamine, or aliphatic benzylalkyl ammonium salts or any amount disclosed below for tetraalkyl ammonium salts.

Tetraalkyl Ammonium Salts

The disclosed antimicrobial compositions can comprise a tetraalkyl ammonium salt. Suitable tetraalkyl ammonium salts comprise four alkyl moieties, as disclosed herein, and a counterion, also disclosed herein. In one example, a tetralkyl ammonium salt can comprise one long chain alkyl moiety (e.g., greater than 10 carbon atoms in length) and three short chain alkyl moieties (e.g., 10 carbon atoms or less in length).

Some specific examples of tetraalkyl ammonium salts that can be included in the disclosed antimicrobial compositions include, but are not limited to, cetyl trimethyl ammonium halide (e.g., chloride or bromide), lauryl trimethyl ammonium halide (e.g., chloride or bromide), myristyl trimethyl ammonium halide (e.g., chloride or bromide), stearyl trimethyl ammonium halide (e.g., chloride or bromide), arachidyl trimethyl ammonium halide (e.g., chloride or bromide), or mixtures thereof. Other examples include, but are not limited to, cetyl dimethylethyl ammonium bromide, lauryl dimethylethyl ammonium chloride, lauryl dimethylethyl ammonium bromide, myristyl dimethylethyl ammonium chloride, myristyl dimethylethyl ammonium bromide, stearyl dimethylethyl ammonium chloride, stearyl dimethylethyl ammonium bromide, arachidyl dimethylethyl ammonium chloride, arachidyl dimethylethyl ammonium bromide, or mixtures thereof.

Amounts

The tetraalkyl ammonium salts disclosed herein can be prepared by methods known in the art or can be obtained from commercial sources. The tetraalkyl ammonium salt can be present in the disclosed antimicrobial compositions in an amount of from less than about 1.0 weight %, less than about 0.75 weight %, less than about 0.5 weight %, less than about 0.25 weight %, less than about 0.10 weight %, less than about 0.075 weight %, less than about 0.05 weight %, less than about 0.025 weight %, less than about 0.01 weight %, less than about 0.0075 weight %, less than about 0.005 weight %, less than about 0.0025 weight %, or less than about 0.001 weight %, based on the total weight of the antimicrobial composition. In another example, the tetraalkyl ammonium salt can be present in the antimicrobial compositions disclosed herein in an amount of from greater than about 0.001 weight %, greater than about 0.0025 weight %, greater than about 0.005 weight %, greater than about 0.0075 weight %, greater than about 0.01 weight %, greater than about 0.025 weight %, greater than about 0.05 weight %, greater than about 0.075 weight %, greater than about 0.1 weight %, greater than about 0.25 weight %, greater than about 0.5 weight %, greater than about 0.75 weight %, or greater than about 1.0 weight %, based on the total weight of the antimicrobial composition. In still another example, the tetraalkyl ammonium salt can be present in the antimicrobial compositions disclosed herein in an amount of from about 0.001 to about 1.0 weight %, from about 0.0025 to about 0.75 weight %, from about 0.005 to about 0.5 weight %, 0.005 to about 0.1 weight %, from about 0.0075 to about 0.25 weight %, from about 0.01 to about 0.1 weight %, from about 0.025 to about 0.075 weight %, about 0.005 to about 0.1 weight %, about 0.005 to about 0.02 weight %, about 0.005 to about 0.01 weight %, or about 0.01 weight %, based on the total weight of the antimicrobial composition. Still further, the tetraalkyl ammonium salt can be present in an amount of from about 0.001 to about 0.1 weight %, from about 0.005 to about 0.075 weight %, from about 0.0075 about 0.05 weight %, or from about 0.01 to about 0.02 weight %, based on the total weight of the antimicrobial composition. In yet another example, the tetraalkyl ammonium salt can be present in the antimicrobial compositions disclosed herein in an amount of about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 weight %, based on the total weight of the antimicrobial composition and where any of the stated values can form an upper or lower endpoint when appropriate.

In another example, the disclosed antimicrobial compositions can contain less than about 1.0 parts by weight, less than about 0.75 parts by weight, less than about 0.5 parts by weight, less than about 0.25 parts by weight, less than about 0.10 parts by weight, less than about 0.075 parts by weight, less than about 0.05 parts by weight, less than about 0.025 parts by weight, less than about 0.01 parts by weight, less than about 0.0075 parts by weight, less than about 0.005 parts by weight, less than about 0.0025 parts by weight, or less than about 0.001 parts by weight of the tetraalkyl ammonium salt. In another example, the antimicrobial compositions disclosed herein can contain greater than about 0.001 parts by weight, greater than about 0.0025 parts by weight, greater than about 0.005 parts by weight, greater than about 0.0075 parts by weight, greater than about 0.01 parts by weight, greater than about 0.025 parts by weight, greater than about 0.05 parts by weight, greater than about 0.075 parts by weight, greater than about 0.1 parts by weight, greater than about 0.25 parts by weight, greater than about 0.5 parts by weight, greater than about 0.75 parts by weight, or greater than about 1.0 parts by weight of the tetraalkyl ammonium salt. In still another example, the antimicrobial compositions disclosed herein can contain from about 0.001 to about 1.0 parts by weight, from about 0.0025 to about 0.75 parts by weight, from about 0.005 to about 0.5 parts by weight, 0.005 to about 0.1 parts by weight, from about 0.0075 to about 0.25 parts by weight, from about 0.01 to about 0.1 parts by weight, from about 0.025 to about 0.075 parts by weight, about 0.005 to about 0.1 parts by weight, about 0.005 to about 0.02 parts by weight, about 0.005 to about 0.01 parts by weight, or about 0.01 parts by weight of the tetraalkyl ammonium salt. Still further, the tetraalkyl ammonium salt can be present in an amount of from about 0.001 to about 0.1 parts by weight, from about 0.005 to about 0.075 parts by weight, from about 0.0075 about 0.05 parts by weight, or from about 0.01 to about 0.02 parts by weight. In yet another example, the antimicrobial compositions disclosed herein can contain about 0.001, 0.0015, 0.002, 0.0025, 0.003, 0.0035, 0.004, 0.0045, 0.005, 0.005, 0.0055, 0.006, 0.0065, 0.007, 0.0075, 0.008, 0.0085, 0.009, 0.009, 0.0095, 0.01, 0.0105, 0.011, 0.0115, 0.012, 0.0125, 0.013, 0.013, 0.0135, 0.014, 0.0145, 0.015, 0.0155, 0.016, 0.0165, 0.017, 0.017, 0.0175, 0.018, 0.0185, 0.019, 0.0195, 0.02, 0.0205, 0.021, 0.021, 0.0215, 0.022, 0.0225, 0.023, 0.0235, 0.024, 0.0245, 0.025, 0.025, 0.03, 0.04, 0.05, 0.06, 0.07, 0.08, 0.09, 0.1, 0.2, 0.3, 0.4, 0.5, 0.6, 0.7, 0.8, 0.9, or 1 parts by weight of the tetraalkyl ammonium salt, where any of the stated values can form an upper or lower endpoint when appropriate.

Still further, the tetraalkyl ammonium salts can be present in the antimicrobial compositions disclosed herein in any amount disclosed above for aliphatic heteroaryl salts, trichloromelamine, aliphatic benzylalkyl ammonium salts, or dialiphatic dialkyl ammonium salts.

Additional Components

In addition to the components disclosed above, the disclosed antimicrobial compositions can be in the form of an aqueous solution, thus, water can be another component of the disclosed compositions. Also, the disclosed antimicrobial compositions can optionally include one or more additional components such as carriers, adjuvants, solubilizing agents, suspending agents, diluents, surfactants, other antimicrobial agents, preservatives, fillers, and additives designed to affect the viscosity, thixotropy or ability of the antimicrobial composition to adhere to and/or penetrate tissue. In one example, it can be desired that one or more of the additional components be consumer acceptable. By "consumer acceptable" is meant a material that is not biologically or otherwise undesirable when consumed, e.g., an agent that is acceptable when used in or on foods and beverages and which can be consumed by an individual (e.g., human, pet, livestock, etc.) along with the selected active components without causing significant undesirable biological effects or interacting in a deleterious manner with any of the other components of the composition in which it is contained. For example, a consumer acceptable agent can be any compound generally recognized as safe (GRAS). These additional components can be prepared by methods known in the art or obtained from commercial sources.

In one example, suitable additional components include surfactants such as Triton X-100 (i.e., polyethylene glycol P-1,1,3,3-tetramethylbutylphenyl ether) for better cell penetration.

Carriers

In other examples, the antimicrobial compositions disclosed herein can further comprise a carrier. The term "carrier" means a compound, composition, substance, or structure that, when in combination with a compound or composition disclosed herein, aids or facilitates preparation, storage, administration, delivery, effectiveness, selectivity, or any other feature of the compound or composition for its intended use or purpose. For example, a carrier can be selected to minimize any degradation of the active components and to minimize any adverse side effects. Examples of suitable aqueous and non-aqueous carriers, diluents, solvents include water, ethanol, polyols (propyleneglycol, polyethyleneglycol, glycerol, and the like), vegetable oils, and suitable mixtures thereof.

Adjuvants

In a further example, the antimicrobial compositions disclosed herein can also comprise adjuvants such as preserving, wetting, emulsifying, suspending agents, and dispensing agents. Prevention of the action of other microorganisms can be accomplished by various antifungal agents, for example, parabens, chlorobutanol, phenol, sorbic acid, and the like. It may also be desirable to include surfactants, binders, as for example, carboxymethylcellulose, alignates, gelatin, polyvinylpyrrolidone, sucrose, and acacia, humectants, as for example, glycerol, wetting agents, as for example, cetyl alcohol, and glycerol monostearate, adsorbents, as for example, kaolin and bentonite, and lubricants, as for example, talc, calcium stearate, magnesium stearate, solid polyethylene glycols, sodium lauryl sulfate, or mixtures thereof.

Solubilizing and Suspending Agents

Suitable suspending agents can include, for example, ethoxylated isostearyl alcohols, polyoxyethylene sorbitol and sorbitan esters, microcrystalline cellulose, aluminum metahydroxide, bentonite, agar-agar and tragacanth, or mixtures of these substances, and the like.

The disclosed antimicrobial compositions can also comprise solubilizing agents and emulsifiers, as for example, ethyl alcohol, isopropyl alcohol, ethyl carbonate, ethyl acetate, benzyl alcohol, benzyl alcohol, benzyl benzoate, propyleneglycol, 1,3-butyleneglycol, dimethylformamide, oils, in particular, cottonseed oil, groundnut oil, corn germ oil, olive oil, castor oil and sesame oil, glycerol, tetrahydrofurfuryl alcohol, polyethyleneglycols and fatty acid esters of sorbitan or mixtures of these substances, and the like.

Additional Quaternary Ammonium Salts

In one aspect, the disclosed antimicrobial compositions can comprise one or more additional quaternary ammonium salts. Other additional quaternary ammonium salts that can be used in the disclosed antimicrobial compositions include, but are not limited to, other aliphatic heteroaryl salts (e.g., alkyl pyridinium halides, alkyl quinolinium halides, alkyl indolinium halides, and the like), aliphatic heterocyclic salts (e.g., aliphatic heterocycloalkyl salts like alkyl piperidinium salts or aliphatic heterocycloalkenyl salts), aliphatic benzylalkyl ammoniums salts, dialiphatic dialkyl ammoniums salts, and tetraalkyl ammonium salts, and chloramine-T.

Amounts

The additional components disclosed herein can be present in the disclosed antimicrobial compositions in any amount as is described above for the trichloromelamine, aliphatic benzylalkyl ammonium salts, dialiphatic dialkyl ammonium salts, and/or tetraalkyl ammonium salts. For example, one or more additional components can be present in an amount of from about 0.001 to about 0.1 weight %, from about 0.005 to about 0.075 weight %, from about 0.0075 about 0.05 weight %, from about 0.01 to about 0.02 weight %, about 0.005 to about 0.1 weight %, about 0.005 to about 0.02 weight %, about 0.005 to about 0.01 weight %, or about 0.01 weight %, based on the total weight of the antimicrobial composition. In another example, the disclosed antimicrobial compositions can contain from about 0.001 to about 0.1 parts by weight, from about 0.005 to about 0.075 parts by weight, from about 0.0075 about 0.05 parts by weight, from about 0.01 to about 0.02 parts by weight, about 0.005 to about 0.1 parts by weight, about 0.005 to about 0.02 parts by weight, about 0.005 to about 0.01 parts by weight, or about 0.01 parts by weight, based of one or more additional components.

Exemplary Compositions

In one aspect, disclosed herein is an antimicrobial composition comprising any two components selected from the group consisting of an aliphatic heteroaryl salt, trichloromelamine, aliphatic benzylalkyl ammonium salt, dialiphatic dialkyl ammonium salt, and tetraalkyl ammonium salt, wherein when two of the listed components are present, the other listed components are not present. For example, disclosed herein are antimicrobial compositions that consist essentially of any two components selected from the group consisting of an aliphatic heteroaryl salt, trichloromelamine, aliphatic benzylalkyl ammonium salt, dialiphatic dialkyl ammonium salt, and tetraalkyl ammonium salt (e.g., an aliphatic heteroaryl salt and trichloromelamine). "Consisting essentially of" is used herein to exclude components that would change the basic and novel characteristics of the composition; this is also meant to exclude the other listed components from the composition but not other carriers, adjuvants, solubilizing and suspending agents, and additional components as described herein. The composition can also comprising water.

In one example, the antimicrobial composition does not contain aliphatic benzylalkyl ammonium salt, dialiphatic dialkyl ammonium salt, and/or tetraalkyl ammonium salt. In another example, the antimicrobial composition does not contain trichloromelamine, dialiphatic dialkyl ammonium salt, and/or tetraalkyl ammonium salt. In another example, the antimicrobial composition does not contain trichloromelamine, aliphatic benzylalkyl ammonium salt, and/or tetraalkyl ammonium salt. In another example, the antimicrobial composition does not contain trichloromelamine, aliphatic benzylalkyl ammonium salt, and/or dialiphatic dialkyl ammonium salt. In another example, the antimicrobial composition does not contain aliphatic heteroaryl salt, dialiphatic dialkyl ammonium salt, and/or tetraalkyl ammonium salt. In another example, the antimicrobial composition does not contain aliphatic heteroaryl salt, aliphatic benzylalkyl ammonium salt, and/or tetraalkyl ammonium salt. In another example, the antimicrobial composition does not contain aliphatic heteroaryl salt, aliphatic benzylalkyl ammonium salt, and/or dialiphatic dialkyl ammonium salt. In another example, the antimicrobial composition does not contain aliphatic heteroaryl salt, trichloromelamine, and/or tetraalkyl ammonium salt. In another example, the antimicrobial composition does not contain aliphatic heteroaryl salt, trichloromelamine, and/or dialiphatic dialkyl ammonium salt. In another example, the antimicrobial composition does not contain aliphatic heteroaryl salt, trichloromelamine, and/or aliphatic benzylalkyl ammonium salt.

In the disclosed compositions, the aliphatic heteroaryl salt can be any aliphatic heteroaryl salt disclosed herein, for example, an alkylpyridinium halide. Such an alkylpyridinium halide can comprise cetylpyridinium chloride, cetylpyridinium bromide, or a mixture thereof. The aliphatic benzylalkyl ammonium salt can be any aliphatic benzylalkyl ammonium salt disclosed herein, for example, an alkyl dimethyl benzyl ammonium chloride, alkyl dimethyl benzyl ammonium bromide, or a mixture thereof.

The composition can contain the aliphatic heteroaryl salt in any of the amounts disclosed above. For example, the aliphatic heteroaryl salt can be present in an amount of from about 3.5 to about 8 parts by weight. The composition can contain trichloromelamine, aliphatic benzylalkyl ammonium salt, dialiphatic dialkyl ammonium salt and/or tetralkyl ammonium salt in any of the amounts disclosed above. For example, trichloromelamine can be present in an amount of from about 0.005 to about 0.02 parts by weight.

In another example, disclosed herein are antimicrobial compositions comprising an aliphatic heteroaryl salt, trichloromelamine; and an ammonium salt selected from the group consisting of an aliphatic benzylalkyl ammonium salt, a dialiphatic dialkyl ammonium salt, and a tetraalkyl ammonium salt. In these compositions, when the ammonium salt is the aliphatic benzyl ammonium salt, the composition does not contain the dialiphatic dialkyl ammonium salt or the tetraalkyl ammonium salt. Alternatively, when the ammonium salt is the dialiphatic dialkyl ammonium salt, the composition does not contain the aliphatic benzyl ammonium salt or the tetraalkyl ammonium salt. Also, when the ammonium salt is the tetraalkyl ammonium salt, the composition does not contain the aliphatic benzyl ammonium salt or the dialiphatic dialkyl ammonium salt. Also disclosed are compositions that consist essential of an aliphatic heteroaryl salt, trichloromelamine, and an ammonium salt selected from the group consisting of an aliphatic benzylalkyl ammonium salt, a dialiphatic dialkyl ammonium salt, and a tetraalkyl ammonium salt. It is also contemplated that these compositions can further comprise water.

In these compositions, the aliphatic heteroaryl salt can be as disclosed above; for example, it can comprise an alkylpyridinium halide as disclosed herein (e.g., cetylpyridinium chloride, cetylpyridinium bromide, or a mixture thereof). When the ammonium salt is the aliphatic benzylalkyl ammonium salt, it can be any aliphatic benzyalkyl ammonium salt disclosed herein (e.g., alkyl dimethyl benzyl ammonium halide, alkyl dimethyl benzyl ammonium halide, or a mixture thereof). When the ammonium salt is the dialiphatic dialkyl ammonium salt, it can be any dialiphatic dialkyl ammonium salt disclosed herein (e.g., didodecyl dimethyl ammonium halide, ditetradecyl dimethyl ammonium halide, dihexadecyl dimethyl ammonium halide, or a mixture thereof). When the ammonium salt is the tetraalkyl ammonium salt, it can be any tetraalkyl ammonium salt disclosed herein (e.g., cetyl trimethyl ammonium halide, lauryl trimethyl ammonium halide, myristyl trimethyl ammonium halide, stearyl trimethyl ammonium halide, arachidyl trimethyl ammonium halide, or a mixture thereof).

The amounts of these components can be as described before. For example, the aliphatic heteroaryl salt can be present in an amount of from about 3.5 to about 8 parts by weight, the trichloromelamine can be present in an amount of from about 0.005 to about 0.02 parts by weight, and the ammonium salt can be present in an amount of from about 0.005 to about 0.1 parts by weight.

In one example, disclosed herein is an antimicrobial composition comprising an aliphatic heteroaryl salt, trichloromelamine, an aliphatic benzylalkyl ammonium salt. In another example, disclosed herein is an antimicrobial composition comprising an aliphatic heteroaryl salt, trichloromelamine, an aliphatic benzylalkyl ammonium salt, and water. For example, a suitable antimicrobial composition can comprise an aliphatic heteroaryl salt in an amount of from about 3.5 to about 8 weight % (or from about 3.5 to about 8 parts by weight). In another example, an antimicrobial composition can comprise an aliphatic benzylalkyl ammonium salt in an amount of from about 0.005 to about 0.1 weight % (or from about 0.005 to about 0.1 parts by weight). In another example, an antimicrobial composition can comprise trichloromelamine in an amount of from about 0.005 to about 0.02 weight % (or from about 0.005 to about 0.02 parts by weight). And in another example, an antimicrobial composition can optionally comprise an additional component in an amount of from about 0.005 to about 0.02 weight % (or from about 0.005 to about 0.02 parts by weight).

A specific example of these compositions includes the composition comprising an aliphatic heteroaryl salt such as cetylpyridinium chloride present in an amount of from about 3.5 to about 8 parts by weight, trichloromelamine present in an amount of from about 0.005 to about 0.02 parts by weight, an aliphatic benzylalkyl ammonium salt such as alkyl dimethyl benzyl ammonium chloride present in an amount of from about 0.005 to about 0.02 parts by weight. In one example, the composition does not contain a dialiphatic dialkyl ammonium salt or a tetraalkyl ammonium salt.

Another example includes the composition comprising an aliphatic heteroaryl salt such as cetylpyridinium chloride present in an amount of from about 3.5 to about 8 parts by weight, trichloromelamine present in an amount of from about 0.005 to about 0.02 parts by weight, and an aliphatic benzylalkyl ammonium salt such as alkyl methylethyl benzyl ammonium chloride present in an amount of from about 0.005 to about 0.1 parts by weight. In one example, the composition does not contain a dialiphatic dialkyl ammonium salt or a tetraalkyl ammonium salt.

Yet another example includes the composition comprising an aliphatic heteroaryl salt such as cetylpyridinium chloride present in an amount of from about 3.5 to about 8 parts by weight, trichloromelamine present in an amount of from about 0.005 to about 0.02 parts by weight, and a dialiphatic dialkyl ammonium salt such as didodecyl dimethyl ammonium chloride present in an amount of from about 0.005 to about 0.1 parts by weight. In one example, the composition does not contain an aliphatic benzylalkyl ammonium salt or a tetraalkyl ammonium salt.

A further example includes the composition comprising an aliphatic heteroaryl salt such as cetylpyridinium chloride present in an amount of from about 3.5 to about 8 parts by weight, trichloromelamine present in an amount of from about 0.005 to about 0.02 parts by weight, and a tetraalkyl ammonium salt such as cetyl dimethyl ammonium chloride present in an amount of from about 0.005 to about 0.1 parts by weight. In one example, the composition does not contain a dialiphatic dialkyl ammonium salt or an aliphatic benzylalkyl ammonium salt.

In another example, disclosed herein is an antimicrobial composition comprising alkyl pyridinium halide (e.g., cetylpyridinium halide), alkyl benzylalkyl ammonium halide, and trichloromelamine. For example, a suitable antimicrobial composition can comprise alkyl pyridinium halide in an amount of from about 3.5 to about 8 weight % (or from about 3.5 to about 8 parts by weight), alkyl benzylalkyl ammonium halide (e.g., alkyl dimethyl benzyl ammonium chloride and/or alkyl methylethyl benzyl ammonium chloride) in an amount of from about 0.005 to about 0.1 weight % (or from about 0.005 to about 0.1 parts by weight), trichloromelamine in an amount of from about 0.005 to about 0.02 weight % (or from about 0.005 to about 0.02 parts by weight) and a balance of water. Another suitable example involves the use of the bromide salts of the previous composition.

In yet another example, a suitable antimicrobial composition can comprise 7.5 weight % (from about 7.5 parts by weight) of alkyl pyridinium halide (e.g., cetylpyridinium chloride (and/or bromide), 0.01 weight % (or 0.01 part by weight) of aliphatic benzylalkyl ammonium halide (e.g., cetyl dimethyl benzyl ammonium chloride and/or bromide), 0.01 weight % (or 0.01 part by weight) of trichloromelamine and a balance of water.

In still another example, disclosed are aqueous compositions comprising effective amounts of a combination of at least two quaternary ammonium salts, an ammonium halide, trichlormelamine, and water. The combination of at least two quaternary ammonium salts is selected from the group consisting of cetyl pyridinium chloride, N-alkyl dimethyl benzyl ammonium chloride, and alkyl dimethyl ethyl benzyl ammonium chloride. The combination of at least two quaternary ammonium salts is present in an amount of about 6.02 to 8.02 weight percent.

In a further example, disclosed herein are composition that contain an aliphatic heteroaryl salt and trichloromelamine. The amount of these components can be as described above.

Still further, a suitable antimicrobial composition can contain an aliphatic heteroaryl salt, trichloromelamine, and a tetraalkyl ammonium salt. The amount of these components in the composition can be as described above.

In one other example, the disclosed compositions do not contain a cetylpyridinium halide, a benzalkyl ammonium halide, trichloromelamine, and water.

Forms

Depending on the intended mode of use, as is discussed below, the antimicrobial compositions disclosed herein can be in the form of solid, semi-solid, liquid, or gel forms, such as, for example, tablets, pills, capsules, powders, liquids, suspensions, dispersions, or emulsions. Also, the compositions disclosed herein can be in a form suitable for dilution. That is, the compositions can be in the form of an aqueous or non-aqueous stock solution, concentrate, concentrated solution, dispersion, emulsion, or suspension that can be diluted to a desired concentration with a suitable solvent (e.g., water). Similarly, the compositions can be in the form of a powder, paste, cream, or solid that can be reconstituted or mixed with a solvent and diluted to a desired concentration to form a solution or dispersion, emulsion, or suspension. In one example, the disclosed antimicrobial compositions can be in the form of a solution, such as an aqueous solution.

It has been found that the disclosed antimicrobial compositions are equally effective even when concentrated or when diluted with water up to a certain point. For example, it has been found that the disclosed antimicrobial compositions can be diluted with water in the range of about 1 to about 400 parts water to one part antimicrobial composition and still perform effectively. In some specific examples, the antimicrobial compositions disclosed herein can be diluted with water in a ratio of about 1:1, 2:1, 3:1, 4:1, 5:1, 6:1, 7:1, 8:1, 9:1, 10:1, 11:1, 12:1, 13:1, 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 39:1, 40:1, 41:1, 42:1, 43:1, 44:1, 45:1, 46:1, 47:1, 48:1, 49:1, 50:1, 51:1, 52:1, 53:1, 54:1, 55:1, 56:1, 57:1, 58:1, 59:1, 60:1, 61:1, 62:1, 63:1, 64:1, 65:1, 66:1, 67:1, 68:1, 69:1, 70:1, 71:1, 72:1, 73:1, 74:1, 75:1, 76:1, 77:1, 78:1, 79:1, 80:1, 81:1, 82:1, 83:1, 84:1, 85:1, 86:1, 87:1, 88:1, 89:1, 90:1, 91:1, 92:1, 93:1, 94:1, 95:1, 96:1, 97:1, 98:1, 99:1, 100:1, 101:1, 102:1, 103:1, 104:1, 105:1, 106:1, 107:1, 108:1, 109:1, 110:1, 111:1, 112:1, 113:1, 114:1, 115:1, 116:1, 117:1, 118:1, 119:1, 120:1, 121:1, 122:1, 123:1, 124:1, 125:1, 126:1, 127:1, 128:1, 129:1, 130:1, 131:1, 132:1, 133:1, 134:1, 135:1, 136:1, 137:1, 138:1, 139:1, 140:1, 141:1, 142:1, 143:1, 144:1, 145:1, 146:1, 147:1, 148:1, 149:1, 150:1, 151:1, 152:1, 153:1, 154:1, 155:1, 156:1, 157:1, 158:1, 159:1, 160:1, 161:1, 162:1, 163:1, 164:1, 165:1, 166:1, 167:1, 168:1, 169:1, 170:1, 171:1, 172:1, 173:1, 174:1, 175:1, 176:1, 177:1, 178:1, 179:1, 180:1, 181:1, 182:1, 183:1, 184:1, 185:1, 186:1, 187:1, 188:1, 189:1, 190:1, 191:1, 192:1, 193:1, 194:1, 195:1, 196:1, 197:1, 198:1, 199:1, 200:1, 201:1, 202:1, 203:1, 204:1, 205:1, 206:1, 207:1, 208:1, 209:1, 210:1, 211:1, 212:1, 213:1, 214:1, 215:1, 216:1, 217:1, 218:1, 219:1, 220:1, 221:1, 222:1, 223:1, 224:1, 225:1, 226:1, 227:1, 228:1, 229:1, 230:1, 231:1, 232:1, 233:1, 234:1, 235:1, 236:1, 237:1, 238:1, 239:1, 240:1, 241:1, 242:1, 243:1, 244:1, 245:1, 246:1, 247:1, 248:1, 249:1, 250:1, 251:1, 252:1, 253:1, 254:1, 255:1, 256:1, 257:1, 258:1, 259:1, 260:1, 261:1, 262:1, 263:1, 264:1, 265:1, 266:1, 267:1, 268:1, 269:1, 270:1, 271:1, 272:1, 273:1, 274:1, 275:1, 276:1, 277:1, 278:1, 279:1, 280:1, 281:1, 282:1, 283:1, 284:1, 285:1, 286:1, 287:1, 288:1, 289:1, 290:1, 291:1, 292:1, 293:1, 294:1, 295:1, 296:1, 297:1, 298:1, 299:1, 300:1, 301:1, 302:1, 303:1, 304:1, 305:1, 306:1, 307:1, 308:1, 309:1, 310:1, 311:1, 312:1, 313:1, 314:1, 315:1, 316:1, 317:1, 318:1, 319:1, 320:1, 321:1, 322:1, 323:1, 324:1, 325:1, 326:1, 327:1, 328:1, 329:1, 330:1, 331:1, 332:1, 333:1, 334:1, 335:1, 336:1, 337:1, 338:1, 339:1, 340:1, 341:1, 342:1, 343:1, 344:1, 345:1, 346:1, 347:1, 348:1, 349:1, 350:1, 351:1, 352:1, 353:1, 354:1, 355:1, 356:1, 357:1, 358:1, 359:1, 360:1, 361:1, 362:1, 363:1, 364:1, 365:1, 366:1, 367:1, 368:1, 369:1, 370:1, 371:1, 372:1, 373:1, 374:1, 375:1, 376:1, 377:1, 378:1, 379:1, 380:1, 381:1, 382:1, 383:1, 384:1, 385:1, 386:1, 387:1, 388:1, 389:1, 390:1, 391:1, 392:1, 393:1, 394:1, 395:1, 396:1, 397:1, 398:1, 399:1, or 400:1 parts water to parts antimicrobial composition; these ratios can also be an upper and lower endpoint of a range of ratios when appropriate.

The disclosed antimicrobial compositions can still be effective when present in a solution at from about 15 to about 500 parts per million (ppm), or from about 20 to about 200 ppm, based on the aliphatic heteroaryl salt component. For example, the disclosed antimicrobial compositions can be in a solution at about 15, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500 ppm or more, based on the aliphatic heteroaryl salt component, where any of the stated values can form an upper or lower endpoint when appropriate. In some particular aspects, the disclosed compositions can be effective at concentrations of at or below about 100 ppm (e.g., at or below 50 ppm).

Methods of Making

Certain materials, compounds, compositions, and components disclosed herein can be obtained commercially or can be readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989). Alternatively, the components used in the antimicrobial compositions disclosed herein can be purchased from commercial suppliers.

The disclosed antimicrobial compositions can be prepared by admixing, in any order, any two components selected from the group consisting of an aliphatic heteroaryl salt, trichloromelamine, aliphatic benzylalkyl ammonium salt, dialiphatic dialkyl ammonium salt, and tetraalkyl ammonium salt. In another example, the disclosed antimicrobial compositions can be prepared by admixing, in any order, an aliphatic heteroaryl salt, trichloromelamine, and one ammonium salt selected from the group consisting of an aliphatic benzylalkyl ammonium salt, a dialiphatic dialkyl ammonium salt, and tetraalkyl ammonium salt. Also, disclosed are antimicrobial compositions prepared by such methods. The resulting compositions can also be diluted as described herein.

Treatable Microorganisms

As disclosed herein, the antimicrobial compositions can be used to treat various surfaces to reduce, inhibit, prevent, disrupt, degrade, brake-down, eliminate, etc. microorganism growth or survival. By "microorganism" is meant a single or multicelled organism, and can include one or more organisms of the same type or mixtures of organism. The microorganisms that can be treated by the compositions and methods disclosed herein can be Gram-positive or Gram-negative bacteria. Such bacteria can be pathogenic, indicator, and/or spoilage bacteria. In one aspect, the antimicrobial compositions disclosed herein can be used to treat food-borne microorganisms on food surfaces.

The Gram-positive bacteria treatable by the compositions and methods disclosed herein can include, but are not limited to, *M. tuberculosis, M. bovis, M. typhimurium, M. bovis* strain BCG, BCG substrains, *M. avium, M. intracellulare, M. africanum, M. kansasii, M. marinum, M. ulcerans, M. avium* subspecies *paratuberculosis, Staphylococcus aureus, Staphylococcus epidermidis, Staphylococcus equi, Streptococcus pyogenes, Streptococcus agalactiae, Listeria monocytogenes, Listeria ivanovii, Bacillus anthracis, B. subtilis, Nocardia asteroides*, and other *Nocardia* species, *Streptococcus viridans* group, *Peptococcus* species, *Peptostreptococcus* species, *Actinomyces israeli* and other *Actinomyces* species, *Propionibacterium acnes*, and *Enterococcus* species.

The Gram-negative bacteria treatable by the compositions and methods disclosed herein can include, but are not limited to, *Clostridium tetani, Clostridium perfringens, Clostridium botulinum*, other *Clostridium* species, *Pseudomonas aeruginosa*, other *Pseudomonas* species, *Campylobacter* species, *Vibrio cholerae, Ehrlichia* species, *Actinobacillus pleuropneumoniae, Pasteurella haemolytica, Pasteurella multocida*, other *Pasteurella* species, *Legionella pneumophila*, other *Legionella* species, *Salmonella typhi*, other *Salmonella* species, *Shigella* species *Brucella abortus*, other *Brucella* species, *Chlamydi trachomatis, Chlamydia psittaci, Coxiella burnetti, Escherichia coli, Neiserria meningitidis, Neiserria gonorrhea, Haemophilus influenzae, Haemophilus ducreyi*, other *Hemophilus* species, *Yersinia pestis, Yersinia enterolitica*, other *Yersinia* species, *Escherichia coli, Escherichia hirae* and other *Escherichia* species, as well as other Enterobacteriacae, *Brucella abortus* and other *Brucella* species, *Burkholderia cepacia, Burkholderia pseudomallei, Francisella tularensis, Bacteroides fragilis, Fusobascterium nucleatum, Provetella* species, *Cowdria ruminantium, Klebsiella* species, and *Proteus* species.

The above examples of Gram-positive, Gram-negative, pathogenic, indicator, and spoilage bacteria are not intended to be limiting, but are intended to be representative of a larger population including all bacteria that effect public health, as well as non-Gram test responsive bacteria. Examples of other species of microorganisms include, but are not limited to, *Abiotrophia, Achromobacter, Acidaminococcus, Acidovorax, Acinetobacter, Actinobacillus, Actinobaculum, Actinomadura, Actinomyces, Aerococcus, Aeromonas, Afipia, Agrobacterium, Alcaligenes, Alloiococcus, Alteromonas, Amycolata, Amycolatopsis, Anaerobospirillum, Anaerorhabdus, Arachnia, Arcanobacterium, Arcobacter, Arthrobacter, Atopobium, Aureobacterium, Bacteroides, Balneatrix, Bartonella, Bergeyella, Bifidobacterium, Bilophila Branhamella, Borrelia, Bordetella, Brachyspira, Brevibacillus, Brevibacterium, Brevundimonas, Brucella, Burkholderia, Buttiauxella, Butyrivibrio, Calymmatobacterium, Campylobacter, Capnocytophaga, Cardiobacterium, Catonella, Cedecea, Cellulomonas, Centipeda, Chlamydia, Chlamydophila, Chromobacterium, Chyseobacterium, Chryseomonas,*

*Citrobacter, Clostridium, Collinsella, Comamonas, Corynebacterium, Coxiella, Cryptobacterium, Delftia, Dermabacter, Dermatophilus, Desulfomonas, Desulfovibrio, Dialister, Dichelobacter, Dolosicoccus, Dolosigranulum, Edwardsiella, Eggerthella, Ehrlichia, Eikenella, Empedobacter, Enterobacter, Enterococcus, Erwinia, Erysipelothrix, Escherichia, Eubacterium, Ewingella, Exiguobacterium, Facklamia, Filifactor, Flavimonas, Flavobacterium, Francisella, Fusobacterium, Gardnerella, Globicatella, Gemella, Gordona, Haemophilus, Hafnia, Helicobacter, Helococcus, Holdemania Ignavigranum, Johnsonella, Kingella, Klebsiella, Kocuria, Koserella, Kurthia, Kytococcus, Lactobacillus, Lactococcus, Lautropia, Leclercia, Legionella, Leminorella, Leptospira, Leptotrichia, Leuconostoc, Listeria, Listonella, Megasphaera, Methylobacterium, Microbacterium, Micrococcus, Mitsuokella, Mobiluncus, Moellerella, Moraxella, Morganella, Mycobacterium, Mycoplasma, Myroides, Neisseria, Nocardia, Nocardiopsis, Ochrobactrum, Oeskovia, Oligella, Orientia, Paenibacillus, Pantoea, Parachlamydia, Pasteurella, Pediococcus, Peptococcus, Peptostreptococcus, Photobacterium, Photorhabdus, Plesiomonas, Porphyrimonas, Prevotella, Propionibacterium, Proteus, Providencia, Pseudomonas, Pseudonocardia, Pseudoramibacter, Psychrobacter, Rahnella, Ralsionia, Rhodococcus, Rickettsia Rochalimaea, Roseomonas, Rothia, Ruminococcus, Salmonella, Selenomonas, Serpulina, Serratia, Shewenella, Shigella, Simkania, Slackia, Sphingobacterium, Sphingomonas, Spirillum, Staphylococcus, Stenotrophomonas, Stomatococcus, Streptobacillus, Streptococcus, Streptomyces, Succinivibrio, Sutterella, Suttonella, Tatumella, Tissierella, Trabulsiella, Treponema, Tropheryma, Tsakamurella, Turicella, Ureaplasma, Vagococcus, Veillonella, Vibrio, Weeksella, Wolinella, Xanthomonas, Xenorhabdus, Yersinia,* and *Yokenella.*

The disclosed antimicrobial compositions can be used to treat other microorganisms such as, for example, parasites. Examples of parasites that can be treated include, but are not limited to, *Toxoplasma gondii, Plasmodium* species such as *Plasmodium falciparum, Plasmodium vivax, Plasmodium malariae,* and other *Plasmodium* species, *Trypanosoma brucei, Trypanosoma cruzi, Leishmania* species such as *Leishmania major, Schistosoma* such as *Schistosoma mansoni* and other *Shistosoma* species, and *Entamoeba histolytica.*

The disclosed antimicrobial compositions can also be used to treat fungal species such as, but not limited to, *Candida albicans, Cryptococcus neoformans, Histoplama capsulatum, Aspergillus fumigatus, Coccidiodes immitis, Paracoccidiodes brasiliensis, Blastomyces dermitidis, Pneomocystis carnii, Penicillium marneffi, Alternaria alternate,* and *Fusarium* species.

In a specific example, the disclosed antimicrobial compositions can be used to treat is *Salmonella typhimurium, Aeromonas hydrophila, Arcobacter butzleri, Bacillus cereus, Campylobacter jejuni, Escherichia coli, Listeria monocytogenes, Staphylococcus aureus, Pseudomonas fluorescens,* or *Shewanella putrefaciens.*

Uses

The disclosed antimicrobial compositions can, in one aspect, be used to treat a microorganism on a surface (e.g., poultry, meat, raisin, litter, or food contact surfaces, food processing equipment surfaces) by contacting the surface with an effective amount of the disclosed antimicrobial composition. By the term "effective amount" of a composition as provided herein is meant an amount of a composition sufficient to provide the desired result, e.g., reduction or prevention of microorganism growth or survival. As will be pointed out below, the exact amount required will vary from use to use, depending on the type of surface to be contacted, the type of microorganism to be treated, the size of the processing facilities (e.g., the volume of the scalder or chiller), the mode of application (e.g., electrospray or dipping), the particular compositions being used, and the like. Thus, it is not possible to specify an exact "effective amount." However, an appropriate effective amount can be determined by one of ordinary skill in the art using only routine experimentation.

While it is not possible to specify an exact amount, the disclosed antimicrobial compositions can be used neat or diluted in a ratio as described above. Also, when diluted to form an aqueous solution, an amount of the disclosed antimicrobial compositions can be used such that a surface will be contacted, at some point, with a solution having about 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 577, 578, 579, 580, 581, 582, 583, 584, 585, 586, 587, 588, 589, 590, 591, 592, 593, 594, 595, 596, 597, 598, 599, or 600 parts per million (ppm) of the disclosed antimicrobial compositions, based on the aliphatic heteroaryl salt component if present, or based on one of the components trichloromelamine, aliphatic benzylalkyl ammonium salt, dialiphatic dialkyl ammonium salt, or tetraalkyl ammonium salt if present, where any of the stated values can form an upper or lower endpoint when appropriate.

Further, when diluted to form an aqueous solution, an amount of the disclosed antimicrobial compositions can be used such that a surface will be contacted, at some point, with a solution having less than about 200, less than about 100, less than about 50 ppm of the disclosed antimicrobial compositions, based on the aliphatic heteroaryl salt component. For example the surface can be contacted with from about 10 to about 100, from about 50 to about 200 ppm of the disclosed antimicrobial compositions, based on the aliphatic heteroaryl salt component if present, or based on one of the components trichloromelamine, aliphatic benzylalkyl ammonium salt, dialiphatic dialkyl ammonium salt, or tetraalkyl ammonium salt if present.

Figure 1:
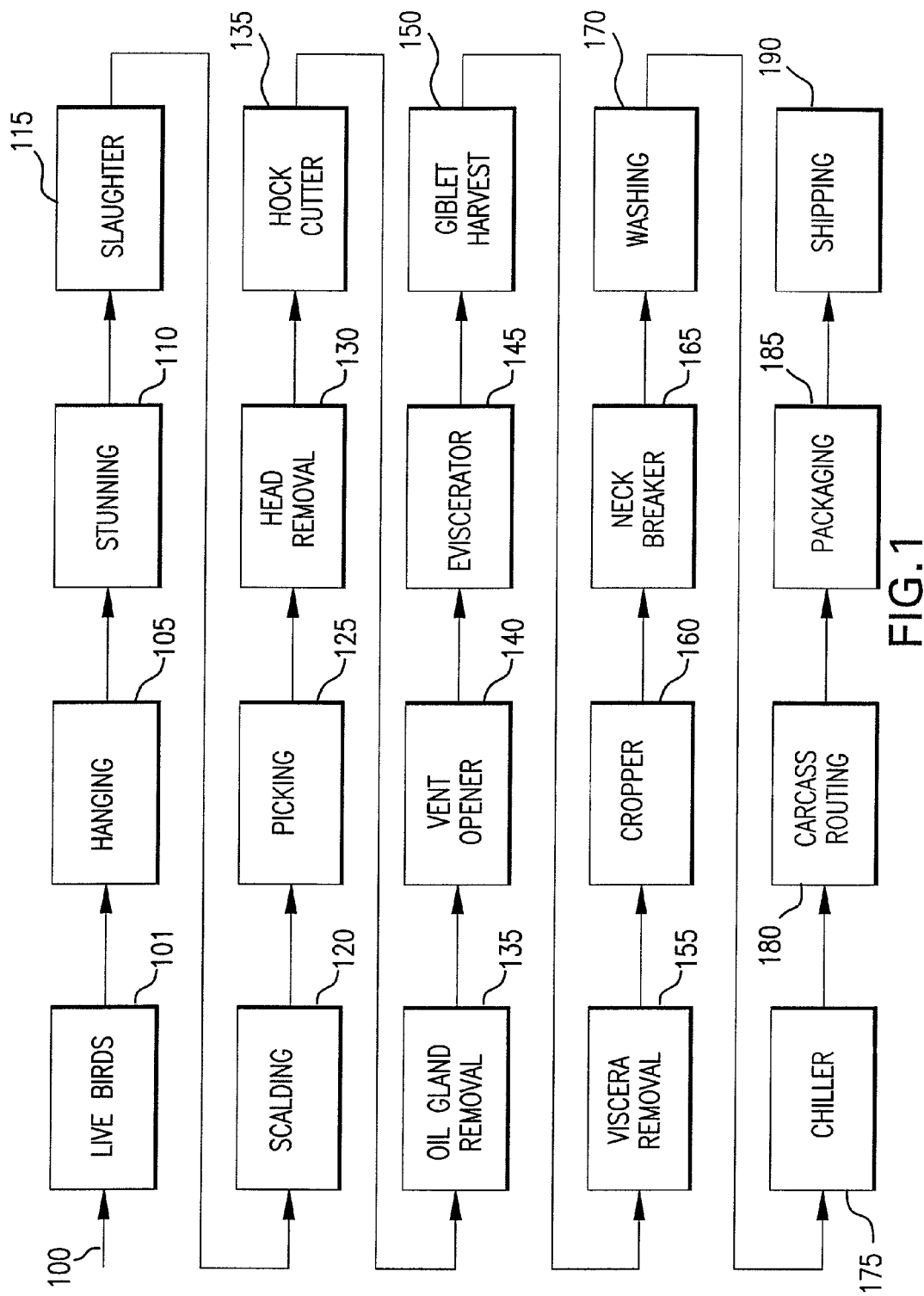
FIG. 1 is a flow chart showing the steps taken in poultry processing.

In another example, the disclosed antimicrobial compositions can be used to treat microorganisms on poultry during poultry processing. FIG. 1 is a flow chart showing the processing steps taken during poultry processing. With reference to FIG. 1, conveyor 100 is used to transport the poultry through various steps of the processing plant. At step 101 live birds brought in are loaded onto an automated conveyor belt at step 105. At step 110, live birds are exposed to electrical current; this stage is also known as stunning. The birds are stunned when their heads (primarily the comb) contact a saline solution in the bottom of the stunner through which an electrical current is surging. This jolt of electricity is not severe enough to permanently damage or kill the bird, but immobilize the bird and allow the body of the bird to become relaxed enough to allow for automated killing. With the birds still hanging upside down, and necks outstretched due to stunning, the birds are exsanguinated by an automated circular blade at step 115 of the process.

After the blood is removed from the poultry, at step 120, the bird is submerged in a large tank of circulating hot water (about 128 to about 134° F.; about 53 to about 57° C.) for about 2 minutes to loosen the feathers. This process is called "scalding." The feathers and skin of the bird come out of the scalding process saturated with water. This process is particularly susceptible to bacterial cross-contamination since the birds are immersed in a common bath. Next is the picking process 125, and head removal 130 are performed. The birds are then dropped off of the aerial conveyor system at hock cutter step 135.

The U.S. Department of Agriculture ("USDA") requires one quart of fresh water or recycled water to be added for each bird that enters the scald tank; thus, there is a continuous overflow of water from the scald tank. In one aspect (see FIG. 2), the scald tank is replenished with the rinsate from the spray system downstream with the antimicrobial solution at slightly less than full strength (e.g., 502 ppm) in order to decrease the cross-contamination of pathogenic bacteria in the scald tank. At start up each day, the scald tank can be treated after it is initially filled with fresh water with the disclosed compositions at full strength. This can assure treatment of birds that pass through the scald tank, prior to the spray system rinsate recycle process.

Referring once again to FIG. 1, at step 135, preen gland is removed and at step 140 a venting machine cut around the vent or the anus of the bird, removing about two inches of any possible remaining fecal mater from the colon. A chlorinated water spray is utilized on this machine to keep any possible fecal material from contaminating the outside skin of the bird. The next machine is the eviscerator (step 145). It uses a spoon-like device to pull the internal organs out of the body cavity. This machine typically has a chlorinated water spray to keep any intestinal contents from coming into contact with the outside surface of the bird. This machine does not entirely remove the guts or "viscera" from the carcass, but gently drapes the "viscera package" onto the back of the bird where it can be viewed by USDA inspection personnel for possible diseases. After the USDA inspector has viewed the entire bird, including the viscera package, the viscera are removed from the carcass and fall into the same offal trough which has already received the preen gland, head, and neck.

In some plants, the gizzard, heart, and liver are harvested from the birds for human consumption (step 150). However, the majority of processors now just let these become part of the inedible material leaving the plant because they receive more money for those products in the animal feeds business than in the consumer market. After the viscera are dropped into the trough or "offal line" (step 155), the lungs are suctioned out of the body cavity and then enter the offal line. This fully eviscerated carcass hanging on the shackle line by the legs is commonly referred to as the WOG (whole carcass without giblets). The next two steps are cropper 160 and the neck breaker 165.

After USDA inspection and viscera removal, the inside and outside of the carcass are thoroughly washed (step 170). While the carcasses are still moving on an overhead conveyor system, they pass through at least one "inside/outside bird washer."

This system is comprised of a stainless steel cabinet that is designed for automated washing of carcasses. Several gallons of water are used to clean each individual carcass, inside and out. All of the water used in these wash cabinets is directed to the offal line. Thus, the spent wash water, water which is continually used to rinse off the evisceration machinery, water from hand and knife washing stations, and fresh water as needed, is utilized to move the inedible material through the offal troughs and is deposited into the waste stream.

Figure 2:
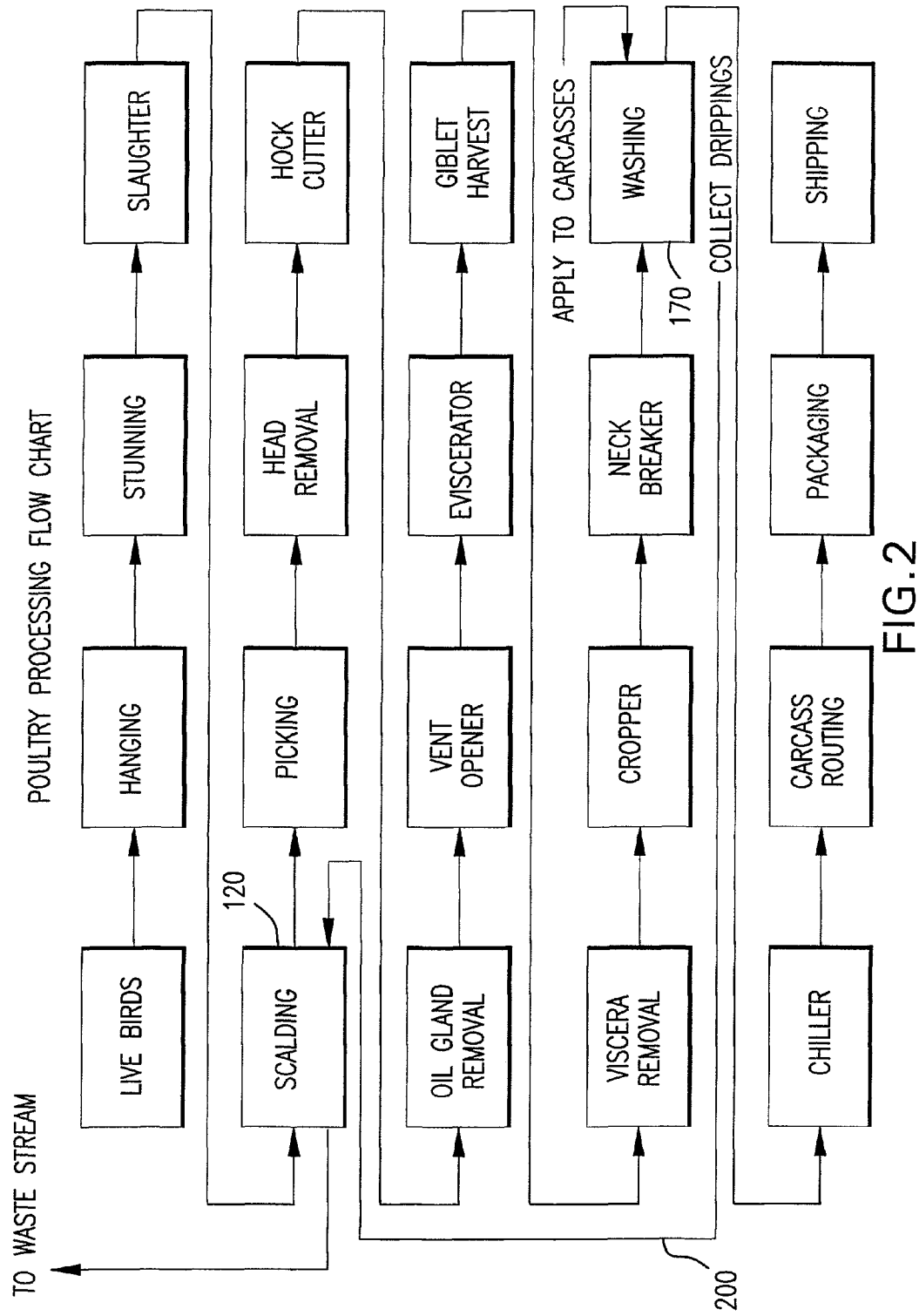
FIG. 2 is a flow chart showing a poultry processing method according to one aspect of the disclosed subject matter.

FIG. 2 is a flow chart showing a processing method according to one aspect of the subject matter disclosed herein. With reference to FIG. 2, the antimicrobial composition disclosed herein can be applied to the poultry at stage 170. This application is typically done by spraying the suspended poultry. The spraying process can include the outside as well as the insides of the poultry. During the spraying process, a predetermined amount of the antimicrobial composition is sprayed on the carcass. As shown in FIG. 2, the runoffs are then collected and supplied to the scalder for reuse; thus, the antimicrobial composition along with fresh water is provided counter-current to the direction of the carcass. Thereafter, they may be reused in the scalder or added to the waste stream. If necessary, additional antimicrobial composition can be added to the recycled stream 200 in order to bring the concentration to the desired level. While the concentration may be varied depending on the application, it has been found that a concentration of about 200 to about 600 parts per million (ppm) of the disclosed compositions to water can be effective.

In another example, the process includes a first exposure of the poultry to the disclosed antimicrobial composition in the scalder (120). Filtered rinse-water from the antimicrobial spray positioned just prior to the chiller can be added to the fresh water entering the scalder at a concentration of about 450 to about 600 ppm (except for start-up where the initial scald tank water can be activated with the disclosed antimicrobial composition at full strength). This water can then pass over the carcasses and exit the scalder at the overflow (where carcasses enter the scalder). Thus, during the scalding step, the carcasses can be exposed to a maximum of about 450 to about 600 ppm of the disclosed antimicrobial composition. The carcasses can then continue down the processing line and through evisceration, cropping, and inside/outside bird washing, and finally pass through the spray cabinet, where a desired concentration of the disclosed antimicrobial composition can be applied again. The birds can then pass through the spray cabinet at normal line speed for application of the disclosed antimicrobial composition (e.g., about 0.2 gram of the antimicrobial solution per pound of carcass). Testing conducted by an independent laboratory showed that less than about 30 ppm of the antimicrobial composition disclosed herein remains on the carcass after both exposure points. That is, the majority of the disclosed antimicrobial composition drains out of the cabinet, is filtered, goes into the scalder, passes by the carcasses in the scalder and is sent to the waste stream. Material balance calculations demonstrate that about 99.9% of the disclosed antimicrobial composition will be sent to the waste stream.

In still another aspect, a drip tray can be included as part of the application system. As the birds exit the spray cabinet on their way to the chiller tank, they can pass over this drip tray, which collects any antimicrobial composition containing fluid that drips from the wet carcasses. This tray can extend for the distance covered by the carcasses in the first minute after they exit the spray cabinet, or typically about one-half the distance to the chiller. The liquid that drips into this tray can be combined with the fluid that drains from the antimicrobial spray cabinet and can be recycled back to the scalder. For the remainder of the distance to the chiller (i.e., the second minute of travel time from the spray cabinet), any liquid that drips from the carcasses can go into the plant's existing floor offal collection system and ultimately will be collected as part of the offal.

As indicated above, after treatment with the disclosed antimicrobial compositions, the carcasses can move via the overhead line to the chilling phase of the process. They drop automatically from the shackle line into a huge tank of water called the pre-chiller. This tank of water is typically held at about 55° F. (about 13° C.) and the carcasses remain in the pre-chiller for about 15 minutes. During this time, the carcasses absorb about 4 to about 5% added moisture. The water in the pre-chiller can be actively aerated to aid in water movement for increased chilling potential and water absorption. This aeration process, combined with the large amount of fat that is present in the pre-chill water, forms a flocculent material that floats on the top of the chill water. This material, typically called "chiller skimmings," is continuously removed from the pre-chiller water and diverted to the offal trough.

From the pre-chiller tank, the carcasses move into the chiller tank (shown as step 175 at FIG. 1). This tank is larger and colder than the pre-chiller, usually about 32 to about 34° F. (about 0 to about 1° C.). The carcasses stay in this tank for about 45 minutes, increasing their moisture content by an additional about 3 to about 4% in the chiller. USDA allows poultry carcasses to gain a total of 8% added moisture. Constant aeration of the chiller water, combined with the fat that is present in the chiller water, forms a large amount of chiller skimmings. As is the case in the pre-chiller, this material is diverted to the offal trough. After chilling, the carcasses are rehung on a different shackle line for transport to other areas of the plant. They may move to a whole carcass packaging station (step 185), to cut-up or de-boning, or they may be shipped to a different plant for further processing and cooking (step 190).

The waste streams for antimicrobial solution in the poultry-processing environment are explained below. As stated, the great majority of the antimicrobial composition present in the spray solution can go to the scalder and, after passing through the scalder, can be conveyed to the waste stream and the offal. To achieve the desired concentration, additional antimicrobial solution can be added to the rinsate collected from the spray cabinet, prior to introduction into the scalder. Based upon calculations, the maximum concentration of antimicrobial solution that can enter the environment as a result of its intended use will be limited to the amount that remains in the water or combined with organic material after passing through the scalder and any residual that may drip from carcasses after spraying or be rinsed from the carcasses during chilling. (This amount has been calculated to be about 502 ppm of the antimicrobial solution residue on the carcass).

Electrostatic Spraying

In one aspect, the antimicrobial solution can be applied by means of electrostatic coating. Use of an electrostatic sprayer can coat substantially all surfaces while requiring a minimal amount of material. Electrostatic spraying was developed over two decades ago and is used to apply pesticides to row crops. Law (Embedded-electrode electrostatic induction spray charging nozzle: theoretical and engineering design. *Transact of the ASAE,* 12:1096-1104, 1978, which is incorporated herein by reference for its teachings of electrostatic spraying) developed an electrostatic spray-charging system using air atomization, which has been used to achieve a 7-fold increase in spray deposition over conventional application methods. In a later study, Law, et al., reported a 1.6 to 24-fold increase in deposition (Law and Lane, Electrostatic deposition of pesticide spray onto foliar targets of varying morphology. *Transact of the ASAE,* 24:1441-1448, 1981, which is incorporated herein by reference for its teachings of electrostatic spraying).

Herzog, et al., demonstrated that insect control on cotton plants was equal to or better than conventional spray application using only one-half the amount of insecticide (Herzog, et al., Evaluation of an electrostatic spray application system for control of insect pests in cotton. *J Econ Entomol,* 6:637-640, 1983, which is incorporated herein by reference for its teachings of electrostatic spraying).

It has been shown in laboratory studies that conventional methods for spraying chicken carcasses required about 5 ozs. (about 148 mL) of sanitizer in order to be effective; whereas, using electrostatic spraying, only about 0.3 ozs. (about 9 mL) is generally required. Of course, the amount of the antimicrobial compositions disclosed herein will depend on the surface area to be treated, the composition concentration, and the like. The amount of the disclosed antimicrobial compositions can be determined by one of skill in the art.

As noted herein, application of the disclosed antimicrobial compositions using electrostatic spraying can significantly increase deposition and decrease the amount of product necessary to prevent microorganism growth and survival. Application of the disclosed antimicrobial compositions can be done after the reprocessing stage or in place thereof. Electrostatic spraying can be done by using air-atomizing induction charge nozzle which allows air and liquid to enter the nozzle separately. The air moves at a high speed through the nozzle and intersects the liquid at the nozzle tip, causing the formation of spray droplets. The droplets are generally about 30 to about 40 micrometers in diameter. The air pressure required is about 30 to about 40 PSI (about 2 to about 3 atm), while the liquid pressure is below about 15 PSI (about 1 atm). As the spray is atomized, the droplets pass a unique embedded induction electrode that induces a charge on each droplet. A rechargeable battery provides the electrical charge. The negatively charged droplets are propelled onto the target surfaces by the force of the turbulent air stream. The target surface (e.g., the poultry) has a naturally positive charge. The electrostatic charge on the spray droplets is negative. Positive electrical charges on the target surface pull the spray droplets to the tops, bottoms and sides of the surface providing 360 degree wrap-around coverage. Once the liquid is shut-off, the air pressure siphons out any remaining spray. Air keeps the nozzle passages clear, reducing maintenance.

Additional Uses

Any surface can be treated by the methods and compositions disclosed herein. As such, the antimicrobial compositions disclosed herein have been found effective for applications other than treatment of poultry. For example, the compositions disclosed herein have been found to be effective for treating poultry litter. The disclosed compositions can be added to the poultry litter as it is being created at the paper mill. It can be applied by electrostatic sprayers while on the paper processing lines. It can be applied to both sides of the paper prior to being chopped into the proper size for use as poultry litter.

Another suitable application of the antimicrobial compositions disclosed herein is in production of raisins. In a typical raisin operation plant, grapes are laid out on a substrate in open air to expose the grapes to the ambient air for drying. The substrate, also being exposed to the ambient air, can be contaminated with various airborne microorganisms. Upon continual use of the substrate, the substrate can contaminate the grapes. It has been found that treating the substrate with the disclosed composition can reduce, if not eliminate, the cross-contamination problem. In a raisin operation plant, the grapes lay on a paper substrate in the fields near the location of the vines until they dry into raisins. Mold and mildew begins to grow as moisture develops from changing dew point caused by weather. The compositions disclosed herein can prevent the growth of the mold and mildew as it is used as a sealant in the paper. The disclosed compositions can be applied by spraying or dipping.

Still other examples of uses for the disclosed antimicrobial compositions include treatment of other meat, fish, vegetable, and fruit.

Additional surfaces that can be treated by the disclosed antimicrobial compositions include, but are not limited to, food processing equipment surfaces such as tanks, conveyors, floors, drains, coolers, freezers, equipment surfaces, walls, valves, belts, pipes, joints, crevasses, combinations thereof, and the like. The surfaces can be metal, for example, aluminum, steel, stainless steel, chrome, titanium, iron, alloys thereof, and the like. The surfaces can also be plastic, for example, polyolefins (e.g., polyethylene, polypropylene, polystyrene, poly(meth)acrylate, acrylonitrile, butadiene, ABS, acrylonitrile butadiene, etc.), polyester (e.g., polyethylene terephthalate, etc.), and polyamide (e.g., nylon), combinations thereof, and the like. The surfaces can also be brick, tile, ceramic, porcelain, wood, vinyl, linoleum, or carpet, combinations thereof, and the like. The surfaces can also, in other aspects, be food, for example, beef, poultry, pork, vegetables, fruits, seafood, combinations thereof, and the like.

Also disclosed are systems comprising a surface (e.g., poultry, food processing equipment surface, etc.) and an antimicrobial composition disclosed herein.

As compared with the conventional treatment methods, the disclosed compositions and methods have been found particularly advantageous in that the treatment process is faster and less caustic. In addition, because a smaller amount of antibacterial composition is used, the process is more effective. Also, the disclosed antimicrobial compositions, in most cases, do not require complex equipment for their application, removal, recycling, or disposal. The following non-limiting examples, further illustrate advantages of the disclosed compositions and methods over conventional antimicrobial solutions and processes.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

The effects of an antimicrobial composition as disclosed herein were studied on pathogenic, indicator, and spoilage populations of bacteria associated with broiler chicken carcasses. Scalder water was collected from the overflow end (the entrance end) of a commercial poultry scalder. The water was autoclaved to eliminate all populations of bacteria and bacterial spores to avoid interference during the study. The autoclaved scalder water was evaluated chemically and compared to raw scalder water to ensure that the organic material in raw and autoclaved scalder water was similar.

A test solution (interchangeably referred to in the examples as the antimicrobial composition) was prepared. The test solution contained cetylpyridinium chloride (7.5 parts by weight), alkyl dimethyl benzyl ammonium chloride (0.1 part by weight), trichloromelamine (0.1 part by weight), cetyl trimethyl ammonium chloride (0.1 part by weight), and water (92.2 parts by weight). Next, a control solution was prepared by admixing cetylpyridinium chloride (7.5 parts by weight) and water (92.5 parts by weight). The same solutions were used in Examples 1-5.

Sets of test tubes were prepared by adding 9 mL of autoclaved (sterilized) scalder water to sterile polystyrene test tubes. One set was prepared as controls by adding 9 mL of autoclaved scalder water to tubes. Another set was prepared by adding 9 mL of autoclaved scalder water and 1 mL of the test solution as identified above. The pathogens were *Salmonella typhimurium* ("ST"), *Listeria monocytogenes* ("LM"), and *Staphylococcus aureau* ("SA"). The indicator was *Escherichia coli* ("EC") and the spoilage bacteria were *Pseudomonas fluorscens* ("PF") and *Shewanella putrefaciens* ("SP"). These microorganisms were grown overnight in Brian Heart infusion broth at 25° C. for 24 hours. Each bacterium was exposed to each autoclaved scalder water-sanitizer combination for 2 minutes to mimic scalding. After exposure period, 1 mL of the suspension was placed into 9 mL of Brian Heart infusion broth and vortexed. One mL of this mixture was placed into the Bactometer module and bacterial growth was measured. The results are provided in FIGS. 3-6.

It can be seen from FIG. 3 that the antimicrobial composition disclosed herein was effective for reducing populations of *Salmonella, Listeria, Staphylococcus*, and *Shewanella* when used in combination with scalder water applications. In the meantime, a substantial reduction is seen for *Escherichia coli* and *Pseudomonas fluorescens*. In comparison, the control solution eliminated much less of any of the above microorganisms.

FIG. 4 is a graph that comparatively shows the reduction of bacterial colonies when exposed to a solution as disclosed herein and a solution of only cetylpyridinium chloride. The colony forming units for *Salmonella typhimurium, Listeria monocytogenes, Staphylococcus aureau*, and *Escherichia* coli were tested. Although not depicted with $Log_{10}$ CFU in FIG. 4, *Pseudomonas* was also reduced to below 10 CFU/mL.

FIG. 5 is a graph showing the effect of the test solution as compared with the control solution. It can be seen from FIG. 5 that over a period of 24 hours, *Salmonella typhimurium*, *Listeria monocytogenes*, *Staphylococcus aureus*, and *Shewanella putrefaciens* were completely eliminated while *E. coli* and *Pseudomonas fluorscens* were substantially reduced as compared with samples treated with the control solution.

FIG. 6 is a graph that comparatively shows the reduction of bacterial colonies when exposed to the test solution and the control solution. FIG. 6 is similar to FIG. 4 and shows that the colony forming units for all microorganisms where nearly eliminated upon treatment with the antimicrobial test solution. Thus, the antimicrobial solution was effective in eliminating all pathogenic, indicator, and spoilage bacteria tested in combination with scalder water applications. This data also indicates effectiveness of the test solution against very high concentrations of bacteria.

Example 2

Example 2 was conducted to measure the effects of antimicrobial solution at various concentrations on pathogenic, indicator and spoilage populations of bacteria associated with poultry. To this end, scalder water was collected from the overflow end (entrance end) of a commercial poultry scalder. The water was autoclaved to eliminate all populations of bacterial and bacterial spores to avoid interference during the study.

The autoclaved scalder water was evaluated chemically and compared to raw scalder water to ensure that the organic material demand in raw and autoclaved scalder water were similar.

The antimicrobial composition as in Example 1 was diluted with deionized water to ratios of about 1:100, 1:150, 1:200, 1:300, and 1:400 (composition to water).

Sets of test tubes were prepared as controls by adding 9 mL of autoclaved (sterilized) scalder water to sterile polystyrene test tubes. One set was prepared as controls by adding 9 mL of autoclaved scalder water to test tubes. One set was prepared by adding 9 mL of autoclaved sclader water and 1 mL of each antimicrobial solution. The control solution, as with the previous examples, comprised a cetylpyridinium chloride solution in water.

The pathogens *Salmonella typhimurium, Listeria monocytogenes, Staphylococcus aureus*, the indicator *Escherichia coli*, and the spoilage bacteria *Pseudomonas fluorescens* and *Shewanella putrefaciens* were grown overnight in Brian Heart infusion broth at 25° C. for 24 hours. Each bacterium was exposed to each autoclaved scalder water-sanitized combination for 2 minutes to mimic scalding. After exposure period, 1 mL of the suspension was placed into 9 mL of the Brian Heart infusion broth and vortexed. One mL of this mixture was then placed into the Bactometer module well and bacterial growth was measured. The results are presented in Tables 1-7.

The antimicrobial test solution disclosed above was found effective for eliminating populations of *Salmonella, Pseudomonas*, and *Shewanella* especially when used at concentrations of 1:150 or lower with scalder water applications. Table 1 is a graph that comparatively shows the effects antimicrobial solution at various concentrations as compared with a control solution. It can be seen from Table 1 that bacterial elimination is fairly high for a solution diluted to about 1:100. Table 1 also shows the comparative effect of the test solution on *Salmonella typhimurium* as compared with a control solution. It can also be seen in Table 1 that the test solution diluted to about 1:100 and 1:150 is very effective in reducing colony forming units.

TABLE 1

The effect of Test Solution at various concentrations on *Salmonella typhimurium*

| | Detection Time (hours) (bacterial elimination at 24 hours) | |
|---|---|---|
| | Controls | Test Solution |
| 1 to 100 | 5.9 | 23.28 |
| 1 to 150 | 5.25 | 19.44 |
| 1 to 200 | 5.35 | 6.89 |
| 1 to 300 | 5.2 | 6.33 |
| 1 to 400 | 5.25 | 5.63 |

| | $Log_{10}$ Colony Forming Units | |
|---|---|---|
| | Controls | Test Solution |
| 1 to 100 | 4.94 | 0.1 |
| 1 to 150 | 5.41 | 0.1 |
| 1 to 200 | 5.34 | 4.22 |
| 1 to 300 | 5.45 | 4.63 |
| 1 to 400 | 5.41 | 5.13 |

The effect of the antimicrobial solution on *Listeria* is shown in Table 2. It can be seen that the test solution according to the exemplary embodiment of the invention completely eliminated populations of *Listeria* and *Staphylococcus* at all concentrations, including solutions diluted with water to about 1:400. Table 2 also shows that colony forming units were substantially eliminated by the antimicrobial solution at all concentrations.

TABLE 2

The effect of Test Solution at various concentrations on *Listeria monocytogenes*

| | Detection Time (hours) (bacterial elimination at 24 hours) | |
|---|---|---|
| | Controls | Test Solution |
| 1 to 100 | 7.15 | 24 |
| 1 to 150 | 6.25 | 24 |
| 1 to 200 | 7.05 | 24 |
| 1 to 300 | 7.1 | 24 |
| 1 to 400 | 6.7 | 24 |

| | $Log_{10}$ Colony Forming Units | |
|---|---|---|
| | Controls | Test Solution |
| 1 to 100 | 5.54 | 0 |
| 1 to 150 | 5.97 | 0 |
| 1 to 200 | 5.59 | 0 |
| 1 to 300 | 5.56 | 0 |
| 1 to 400 | 5.76 | 0 |

Table 3 shows the comparative effects of various dilutions of the antimicrobial test solution on *E. coli*. As shown, the test solution was able to eliminate populations of *E. coli* at a dilution of about 1:100. At dilutions of about 1:150 (or lower) the test solution was able to eliminate all species tested with the exception of *E. coli*. Because *E. coli* is not a pathogen, it is not necessary that it be eliminated at the scalder. Instead, it can be eliminated later in the process. For this reason, a water dilution of about 1:150 has been found to be suitable for the scalder.

TABLE 3

The effect of Test Solution at various concentrations on *Escherichia coli*

| | Detection Time (hours) (bacterial elimination at 24 hours) | |
|---|---|---|
| | Controls | Test Solution |
| 1 to 100 | 4.85 | 24 |
| 1 to 150 | 4.3 | 5.07 |
| 1 to 200 | 4.45 | 5.72 |
| 1 to 300 | 4.5 | 5.03 |
| 1 to 400 | 4.1 | 4.98 |

| | $Log_{10}$ Colony Forming Units | |
|---|---|---|
| | Controls | Test Solution |
| 1 to 100 | 5.13 | 0 |
| 1 to 150 | 5.67 | 4.92 |
| 1 to 200 | 5.52 | 4.29 |
| 1 to 300 | 5.47 | 4.96 |
| 1 to 400 | 5.86 | 5 |

Table 4 shows the comparative effects of the test solution at different concentration on *Staphylococcus aureus*.

TABLE 4

The effect of Test Solution at various concentrations on *Staphylococcus aureus*

| | Detection Time (hours) (bacterial elimination at 24 hours) | |
|---|---|---|
| | Controls | Test Solution |
| 1 to 100 | 7.8 | 24 |
| 1 to 150 | 6.9 | 24 |
| 1 to 200 | 7.25 | 24 |
| 1 to 300 | 7.3 | 24 |
| 1 to 400 | 7.1 | 24 |

| | $Log_{10}$ Colony Forming Units | |
|---|---|---|
| | Controls | Test Solution |
| 1 to 100 | 2.56 | 0 |
| 1 to 150 | 3.32 | 0 |
| 1 to 200 | 3.02 | 0 |
| 1 to 300 | 2.98 | 0 |
| 1 to 400 | 3.15 | 0 |

Tables 5 and 6 comparatively show the effect of the test solution at different concentrations on *Pseudomonas fluorescens* and *Shewanella putrefaciens*.

TABLE 5

The effect of Test Solution various concentrations on *Pseudomonas fluorescens*

| | Detection Time (hours) (bacterial elimination at 24 hours) | |
|---|---|---|
| | Controls | Test Solution |
| 1 to 100 | 4.7 | 23.88 |
| 1 to 150 | 4.1 | 10.29 |
| 1 to 200 | 4.4 | 5.66 |
| 1 to 300 | 4.4 | 4.88 |
| 1 to 400 | 3.95 | 4.81 |

TABLE 6

The effect of Test Solution at various concentrations on *Shewanella putrefaciens*

| | Detection Time (hours) (bacterial elimination at 24 hours) | |
|---|---|---|
| | Controls | Test Solution |
| 1 to 100 | 6.75 | 24 |
| 1 to 150 | 6.05 | 24 |
| 1 to 200 | 6.65 | 6.89 |
| 1 to 300 | 6.6 | 11.12 |
| 1 to 400 | 6.2 | 11.61 |

Finally, Table 7 comparatively shows the effect of the antimicrobial solution for eliminating colony forming units of *Campylobacter jejuni* at a dilution of 1:150. These results verify that the antimicrobial test solution disclosed herein is superior over the conventional compositions for treating microorganisms.

TABLE 7

The effect of Test Solution on *Campylobacter jejuni* at a dilution of 1:150

| | $Log_{10}$ Colony Forming Units | |
|---|---|---|
| | Controls | Test Solution |
| 1 to 150 | 4.6 | 0 |

Example 3

The effects of the antimicrobial test solution on pathogenic indicator and spoilage populations of bacteria associated with broiler chicken carcasses attached to food contact surfaces were studied.

The pathogens, *Salmonella typhimurium*, *Listeria monocytogenes*, *Staphylococcus aureus*, the indictor *Escherichia coli*, and the spoilage bacteria *Pseudomonas Fluorescens* and *Shewanella putrefaciens* were grown overnight in Brian Heart infusion broth at 25° C. for 24 hours. Five sterile TEFLON™ coupons were coated with 0.200 mL of each of the pathogens, the indicator or the spoilage species of bacteria (total of 30 coupons). The bacterial inocula were allowed to dry on the surface of the coupon for 4 hours. Each coupon was sprayed for 10 seconds (3 separate sprays) using a 1:100 concentration of the test solution. Each coupon was completely coated with 30 mL solution of this solution. No sanitizer residual or wet appearance occurred. After the exposure period each coupon was rinsed in 100 mL of sterile 1% buffered peptone broth. One mL of this mixture was then placed into 9 mL of Brian Heart infusion broth and then 1 mL of this mixture was placed into the Bactometer module well for measuring bacterial growth.

A control solution as disclosed above was prepared. In addition, an antimicrobial solution as disclosed herein was prepared for testing purposes. A sample of the coupons coated with the control solution and the balance was coated with the disclosed antimicrobial solution. In both applications, electrostatic coating technique was used to adherently coat the entire surface of the coupon substrate.

The results are shown at FIG. 7. It can be seen from FIG. 7 that the test solution was extremely effective in eliminating populations of *Salmonella, Listeria, Staphylococcus, E. coli*, and *Pseudomonas* on food-contact surfaces. This method is effective for treating and sanitizing food-contact surfaces before or after processing operation.

Example 4

The effect of the antimicrobial composition which was applied using a sprayer and immersion in treated scalder water on *Salmonella typhimurium* and *E. coli* attached to broiler carcasses were studied. For this experiment, poultry samples were selected prior to the scalder step of the process. The control samples were treated with water and the test samples were treated with the antimicrobial solution. All samples were treated with *Salmonella* to establish a baseline. Next, two different scalder baths were prepared; one contained scalder water and the other contained scalder water treated with the antimicrobial solution. The control samples were sprayed with water to simulate the washing step 170 (FIG. 1). The test samples were processed in the same manner except the scalder water contained the antimicrobial solution and the sprayer contained the antimicrobial solution at a 1:150 dilution. The test was repeated three times (Reps. 1-3) and the *Salmonella* content of the samples were recorded. FIG. 8 compares *Salmonella* content in control samples treated with water and test samples treated with diluted antimicrobial solution.

The procedure outlined about was repeated except that the samples were treated with *E. coli* and Coliform for establishing a baseline. Here, only one set of control and test samples were tested and the result is presented in FIG. 9. Referring to FIG. 9, it can be seen that *E. coli* and Coliform colony forming units were substantially reduced in test samples as compared with the control samples.

Example 5

The following studies were conducted to evaluate the amount of residual antimicrobial composition left on the broiler chicken carcass after simulated treatment.

Study I (in-line reprocessing simulation)—Four broiler chicken carcasses were purchased from a local retail outlet. Two of the carcasses were rinsed with water for 3-5 seconds to simulate rinsing that takes place in the processing plant immediately prior to automated in-line reprocessing. The carcasses were then sprayed (to simulate delusion using an in-line sprayer) in an antimicrobial solution prepared according to Example 1 at a dilution of 150:1. The carcasses were allowed to remain for two minutes to simulate the drip time after in-line reprocessing and chilling. The carcasses were then placed into chilled water for 60 minutes to simulate chilling. During the chilling process, the carcasses were periodically stirred to simulate aeration. Additionally, the water was completely exchanged with fresh water after 30 minutes to simulate commercial situations. The carcasses where then cooked at 350° F. (177° C.) for about 45 minutes.

Study II (In-line reprocessing and scalding simulation)—Two of the carcasses were dipped for two minutes into 130° F. (54° C.) water containing an antimicrobial solution prepared according to Example 1 at a 150:1 dilution to simulate commercial scalding conditions. Carcasses were rinsed for 3-5 seconds to simulate the rinse spray between the scalder and the in-line reprocessing system. The carcasses were then sprayed (to simulate delusion using an in-line sprayer) in the antimicrobial solution. The carcasses were allowed to remain for two minutes to simulate the drip time after in-line reprocessing and chilling. The carcasses were then placed into chilled water for 60 minutes to simulate chilling. During the chilling process, the carcasses were periodically stirred to simulate aeration. Additionally, the water was completely exchanged with fresh water after 30 minutes to simulate commercial situations. Carcasses were then cooked at 350° F. (177° C.) for 45 minutes.

After cooking, the following steps were followed for each study. Fifty grams of skin was collected from each carcass. The skin samples were individually placed into a blender and 200 mL of deionized water was added. The skin was blended on high for 8 minutes. Three hundred mL of fresh deionized water was added to the blended mixture and blended for an additional 5 minutes. One hundred and fifty mL of the blended mixture was placed into a sample jar and sent to an independent laboratory for testing and evaluation.

Independent laboratory evaluation on fully cooked chickens treated with the antimicrobial solution at a 150:1 concentration indicated that a maximum of only 0.02 ppb could be recovered from the skin samples. The residual discovered on the two carcasses in Study I (in-line reprocessing simulation) was 0.02 parts per billion (ppb) per carcass. The residual discovered on the two carcasses in Study II (in-line reprocessing and scalding simulation) was 0.01 ppb per carcass. Because the amount of residual antimicrobial solution recovered from carcasses treated using simulated commercial conditions for in-line reprocessing and scalding and in-line reprocessing was so inconsequential, it was concluded that use of the proposed composition under these conditions would pose no health hazard.

Independent testing performed on chickens being treated with the disclosed antimicrobial compositions prior to their submergence in the chiller process for 45-60 minutes proved to be very successful in substantially reducing the numbers of pathogens on the chickens. Microbial testing done prior to the chickens introduction into the chiller water compared to microbial test results after exit from the chiller was in excess of 1 log reductions of the pathogen levels. In other words, the disclosed antimicrobial composition can be added to the chiller as it is readily soluble in cold water as well as in warm or hot water.

In one aspect, the combination of the various components in the antimicrobial composition work synergistically to bring about a more efficacious composition. As a result, a much smaller percentage of cetylpyridinium chloride comes into contact with the poultry while far superior bacterial elimination is obtained. Moreover, the conventional composition of cetylpyridinium chloride is less effective against Gram-negative bacteria. The antimicrobial composition s disclosed herein have been found to have superior efficacy against Gram-negative bacteria.

Example 6

The effectiveness of various compositions were tested at several concentrations on *E. coli*, *Salmonella typhimurium*, and *Listeria monocytogenes*. Specifically, stock solutions were prepared from various combinations of the components cetylpyridinium chloride (component "A"), alkyl dimethyl benzyl ammonium chloride (component "B"), cetyl trimethyl ammonium chloride (component "C"), and trichloromelamine (component "D"). The various stock solutions were then diluted with de-ionized water to form 1% v/v (i.e., 10,000 ppm) solutions, 0.0502% v/v (i.e., 502 ppm) solutions, and 0.0015% v/v (i.e., 15 ppm) solutions. A control solution of de-ionized water was also prepared. The various dilute solutions were then contacted to agar plates inoculated with *E. coli*, *Salmonella*, or *Listeria* and incubated for 48 hours at 35° C. Each test was run in triplicate. The results in terms of CFU and $\log_{10}$ CFU are shown in Tables 8-10.

At a 1% concentration, all of the various compositions resulted in 100% growth inhibition (i.e., 0 CFU or no growth).

TABLE 8

Compositions at 1% against E. coli, Salmonella, and Listeria

| Solution | E. Coli CFU | Log | Salmonella CFU | Log | Listeria CFU | Log |
|---|---|---|---|---|---|---|
| A & B | 0 | 0 | 0 | 0 | 0 | 0 |
| A & C | 0 | 0 | 0 | 0 | 0 | 0 |
| A & D | 0 | 0 | 0 | 0 | 0 | 0 |
| B & C | 0 | 0 | 0 | 0 | 0 | 0 |
| B & D | 0 | 0 | 0 | 0 | 0 | 0 |
| C & D | 0 | 0 | 0 | 0 | 0 | 0 |
| A & B & C | 0 | 0 | 0 | 0 | 0 | 0 |
| A & C & D | 0 | 0 | 0 | 0 | 0 | 0 |
| A & B & D | 0 | 0 | 0 | 0 | 0 | 0 |

TABLE 8-continued

Compositions at 1% against E. coli, Salmonella, and Listeria

| Solution | E. Coli CFU | Log | Salmonella CFU | Log | Listeria CFU | Log |
|---|---|---|---|---|---|---|
| B & C & D | 0 | 0 | 0 | 0 | 0 | 0 |
| Control | 6400 | 3.806 | 3600 | 3.556 | 108000 | 5.033 |
|  | 8800 | 3.944 | 3800 | 3.580 | 11000 | 4.041 |
|  | 13800 | 4.140 | 6400 | 3.806 | 148000 | 5.170 |
|  |  | Log Avg. 3.964 |  | Log Avg. 3.647 |  | Log Avg. 4.748 |

TABLE 9

Compositions at 502 ppm against E. coli, Salmonella, and Listeria

| Solution | E. coli CFU | Log | Log Avg. | Salmonella CFU | Log | Log Avg. | Listeria CFU | Log | Log Avg. |
|---|---|---|---|---|---|---|---|---|---|
| A & B | 7900 | 3.897 | 3.766 | 8800 | 3.944 | 3.051 | 2400 | 3.380 | 2.906 |
|  | 1540 | 3.188 |  | 168 | 2.225 |  | 390 | 2.591 |  |
|  | 16300 | 4.212 |  | 960 | 2.982 |  | 560 | 2.748 |  |
| A & C | 28400 | 4.453 | 4.436 | 1080 | 3.033 | 3.386 | 77 | 1.886 | 2.654 |
|  | 29600 | 4.471 |  | 12800 | 4.107 |  | 1502 | 3.177 |  |
|  | 24100 | 4.382 |  | 1040 | 3.017 |  | 790 | 2.898 |  |
| A & D | 0 | 0 | 0 | 8500 | 3.929 | 3.488 | 1240 | 3.093 | 3.105 |
|  | 0 | 0 |  | 7600 | 3.881 |  | 1630 | 3.212 |  |
|  | 0 | 0 |  | 450 | 2.653 |  | 1020 | 3.009 |  |
| B & C | 1440 | 3.158 | 3.338 | 0 | 0 | 0 | 1840 | 3.265 | 1.088 |
|  | 2240 | 3.350 |  | 0 | 0 |  | 0 | 0 |  |
|  | 3200 | 3.505 |  | 0 | 0 |  | 0 | 0 |  |
| B & D | 1820 | 3.260 | 3.327 | 0 | 0 | 0.055 | 0 | 0 | 0 |
|  | 4100 | 3.613 |  | 0 | 0 |  | 0 | 0 |  |
|  | 1280 | 3.107 |  | 44 | 1.643 |  | 0 | 0 |  |
| C & D | 20000 | 4.301 | 4.366 | 45 | 1.653 | 2.221 | 1360 | 3.134 | 3.097 |
|  | 25600 | 4.408 |  | 310 | 2.491 |  | 1120 | 3.049 |  |
|  | 24400 | 4.387 |  | 330 | 2.519 |  | 1280 | 3.107 |  |
| A & B & C | 16800 | 4.225 | 4.392 | 4600 | 3.663 | 3.681 | 440 | 2.643 | 2.978 |
|  | 30000 | 4.477 |  | 5000 | 3.699 |  | 1110 | 3.045 |  |
|  | 29800 | 4.474 |  | 4800 | 3.681 |  | 1760 | 3.246 |  |
| A & B & D | 0 | 0 | 0 | 8200 | 3.914 | 3.840 | 610 | 2.785 | 2.787 |
|  | 0 | 0 |  | 7600 | 3.881 |  | 660 | 2.820 |  |
|  | 0 | 0 |  | 5300 | 3.724 |  | 570 | 2.756 |  |
| A & C & D | 0 | 0 | 0 | 890 | 2.949 | 3.402 | 0 | 0 | 0 |
|  | 0 | 0 |  | 1290 | 3.111 |  | 0 | 0 |  |
|  | 0 | 0 |  | 14000 | 4.146 |  | 0 | 0 |  |
| B & C & D | 28800 | 4.459 | 4.427 | 132 | 2.121 | 2.508 | 1800 | 3.255 | 2.882 |
|  | 24200 | 4.384 |  | 590 | 2.771 |  | 430 | 2.633 |  |
|  | 27400 | 4.438 |  | 430 | 2.633 |  | 570 | 2.756 |  |
| Control | 366000 | 5.563 | 5.557 | 5200 | 3.716 | 3.697 | 360 | 2.556 | 2.908 |
|  | 290000 | 5.462 |  | 3600 | 3.556 |  | 420 | 2.623 |  |
|  | 442000 | 5.645 |  | 6600 | 3.820 |  | 3500 | 3.544 |  |

TABLE 10

Compositions at 15 ppm against E. coli, Salmonella, and Listeria

| Solution | E. coli CFU | Log | Log Avg. | Salmonella CFU | Log | Log Avg. | Listeria CFU | Log | Log Avg. |
|---|---|---|---|---|---|---|---|---|---|
| A & B | 25600 | 4.121 | 4.090 | 66 | 1.820 | 1.381 | 12800 | 4.107 | 4.002 |
|  | 24000 | 4.380 |  | 35 | 1.544 |  | 11000 | 4.041 |  |
|  | 20800 | 4.318 |  | 6 | 0.778 |  | 7200 | 3.857 |  |

TABLE 10-continued

Compositions at 15 ppm against *E. coli*, *Salmonella*, and *Listeria*

| Solution | E. coli CFU | E. coli Log | E. coli Log Avg. | Salmonella CFU | Salmonella Log | Salmonella Log Avg. | Listeria CFU | Listeria Log | Listeria Log Avg. |
|---|---|---|---|---|---|---|---|---|---|
| A & C | 15200 | 4.182 | 4.100 | 1840 | 3.265 | 3.202 | 15200 | 4.183 | 4.189 |
|  | 22000 | 4.342 |  | 1440 | 3.158 |  | 18000 | 4.255 |  |
|  | 18800 | 4.274 |  | 1520 | 3.182 |  | 13500 | 4.130 |  |
| A & D | 28000 | 4.447 | 4.110 | 1760 | 3.246 | 3.199 | 11000 | 4.041 | 4.054 |
|  | 27600 | 4.441 |  | 1480 | 3.170 |  | 13500 | 4.130 |  |
|  | 13600 | 4.134 |  | 1520 | 3.182 |  | 9800 | 3.991 |  |
| B & C | 20800 | 4.318 | 4.008 | 420 | 2.623 | 2.852 | 13200 | 4.121 | 3.959 |
|  | 17600 | 4.246 |  | 760 | 2.881 |  | 6800 | 3.833 |  |
|  | 24000 | 4.380 |  | 1130 | 3.053 |  | 8400 | 3.924 |  |
| B & D | 18400 | 4.265 | 4.101 | 680 | 2.833 | 3.025 | 12000 | 4.079 | 4.084 |
|  | 12800 | 4.107 |  | 1040 | 3.017 |  | 7600 | 3.881 |  |
|  | 15200 | 4.182 |  | 1680 | 3.225 |  | 19600 | 4.292 |  |
| C & D | 26000 | 4.415 | 4.097 | 1840 | 3.265 | 3.206 | 15700 | 4.196 | 4.082 |
|  | 31200 | 4.494 |  | 1280 | 3.107 |  | 13500 | 4.130 |  |
|  | 28000 | 4.447 |  | 1760 | 3.246 |  | 8300 | 3.919 |  |
| A & B & C | 12000 | 4.079 | 4.046 | 1920 | 3.283 | 3.159 | 26000 | 4.415 | 4.296 |
|  | 21200 | 4.326 |  | 1000 | 3.000 |  | 24800 | 4.395 |  |
|  | 14400 | 4.158 |  | 1560 | 3.193 |  | 12000 | 4.079 |  |
| A & B & D | 15600 | 4.193 | 4.040 | 1600 | 3.204 | 3.252 | 0 | 0 | 0 |
|  | 9600 | 3.982 |  | 1920 | 3.283 |  | 0 | 0 |  |
|  | 8800 | 3.945 |  | 1840 | 3.265 |  | 0 | 0 |  |
| A & C & D | 12700 | 4.104 | 4.020 | 2200 | 3.342 | 3.313 | 0 | 0 | 0 |
|  | 9800 | 3.991 |  | 2240 | 3.350 |  | 0 | 0 |  |
|  | 9200 | 3.964 |  | 1760 | 3.246 |  | 0 | 0 |  |
| B & C & D | 11700 | 4.068 | 4.143 | 5700 | 3.756 | 3.649 | 0 | 0 | 0 |
|  | 17800 | 4.250 |  | 1760 | 3.246 |  | 0 | 0 |  |
|  | 12900 | 4.111 |  | 8800 | 3.945 |  | 0 | 0 |  |
| Control | 25200 | 4.401 | 4.180 | 800 | 2.903 | 3.137 | 20000 | 4.301 | 4.094 |
|  | 8000 | 3.903 |  | 1920 | 3.283 |  | 10000 | 4.000 |  |
|  | 17200 | 4.236 |  | 1680 | 3.225 |  | 9600 | 3.982 |  |

Although the exemplary embodiments provided herein are directed to a poultry processing line, it will be understood that the disclosed invention can be applied to meat treatment in general without departing from the spirit of the invention.

It will also be understood by those of skill in the art that although the components of the exemplary embodiments are represented in their respective weight percent, the ratios may nonetheless be varied to include molar or volume percent of each component.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An antimicrobial composition, comprising:
   I. a component having antimicrobial activity, consisting essentially of:
      a. from about 0.001 to about 1.0 weight % of trichloromelamine; and
      b. from about 0.001 to about 1.0 weight % of an ammonium salt selected from the group consisting of an aliphatic benzylalkyl ammonium salt, a dialiphatic dialkyl ammonium salt, and a tetraalkyl ammonium salt;
   wherein when the ammonium salt is the aliphatic benzyl ammonium salt, the composition does not contain the dialiphatic dialkyl ammonium salt or the tetraalkyl ammonium salt,
   wherein when the ammonium salt is the dialiphatic dialkyl ammonium salt, the composition does not contain the aliphatic benzyl ammonium salt or the tetraalkyl ammonium salt, and
   wherein when the ammonium salt is the tetraalkyl ammonium salt, the composition does not contain the aliphatic benzyl ammonium salt or the dialiphatic dialkyl ammonium salt;
   and
   II. water.

2. The composition of claim 1, wherein the ammonium salt is the aliphatic benzylalkyl ammonium salt and comprises alkyl dimethyl benzyl ammonium halide, alkyl methylethyl benzyl ammonium halide, or a mixture thereof.

3. The composition of claim 1, wherein the ammonium salt is the dialiphatic dialkyl ammonium salt and comprises didodecyl dimethyl ammonium halide, ditetradecyl dimethyl ammonium halide, dihexadecyl dimethyl ammonium halide, or a mixture thereof.

4. The composition of claim 1, wherein the ammonium salt is the tetraalkyl ammonium salt and comprises cetyl trimethyl ammonium halide, lauryl trimethyl ammonium halide, myristyl trimethyl ammonium halide, stearyl trimethyl ammonium halide, arachidyl trimethyl ammonium halide, or a mixture thereof.

5. A method for treating a microorganism on a surface, comprising contacting the surface with an effective amount of the composition of claim 1.

6. The method of claim 5, wherein the surface is a poultry, meat, raisin, litter, or food contact surface, or food processing equipment surface.

7. The method of claim 5, wherein the microorganism comprises *Salmonella typhimurium, Aeromonas hydrophile, Arcobacter butzleri, Bacillus cereus, Campylobacter jejuni, Escherichia coli, Listeria monocytogenes, Staphylococcus aureus, Pseudomonas fluorescens*, or *Shewanella putrefaciens*.

8. A method of treating a microorganism on poultry during poultry processing, comprising contacting poultry during poultry processing with an effective amount of a composition of claim 1.

9. The method of claim 8, wherein contacting the poultry is accomplished by spraying the composition onto poultry.

10. The method of claim 8, wherein contacting the poultry is accomplished by electrostatic coating.

11. The method of claim 8, wherein contacting the poultry is accomplished at a washing stage of poultry processing.

12. The method of claim 8, wherein contacting the poultry is accomplished by adding the composition to a scalder.

13. The method of claim 8, wherein contacting the poultry is accomplished by adding the composition to a chiller.

14. An antimicrobial composition, comprising:
 I. a component having antimicrobial activity, consisting essentially of:
  a. from about 0.5 to about 20 weight % of an aliphatic heteroaryl salt;
  b. from about 0.001 to about 1.0 weight % of trichloromelamine; and
 II. water.

15. The composition of claim 14, wherein the aliphatic heteroaryl salt comprises an alkylpyridinium halide.

16. The composition of claim 14, wherein the alkylpyridinium halide comprises cetylpyridinium chloride, cetylpyridinium bromide, or a mixture thereof.

* * * * *